(12) United States Patent
Kosaka et al.

(10) Patent No.: US 11,659,272 B2
(45) Date of Patent: May 23, 2023

(54) DEVICE AND METHOD FOR CAPTURING IMAGES AND SWITCHING IMAGES THROUGH A DRAG OPERATION

(71) Applicant: Sony Group Corporation, Tokyo (JP)

(72) Inventors: Junichi Kosaka, Tokyo (JP); Kenichi Yoneda, Tokyo (JP); Hidehiro Komatsu, Tokyo (JP); Tatsuya Hama, Tokyo (JP); Miyuki Shirakawa, Tokyo (JP); Keiichi Yoshioka, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/722,408

(22) Filed: Apr. 18, 2022

(65) Prior Publication Data

US 2022/0239843 A1 Jul. 28, 2022

Related U.S. Application Data

(63) Continuation of application No. 17/060,105, filed on Oct. 1, 2020, now Pat. No. 11,323,626, which is a
(Continued)

(51) Int. Cl.
*H04N 23/63* (2023.01)
*H04N 1/21* (2006.01)
(Continued)

(52) U.S. Cl.
CPC ......... *H04N 23/631* (2023.01); *G06F 3/0488* (2013.01); *H04N 1/00204* (2013.01);
(Continued)

(58) Field of Classification Search
CPC .............. G06F 3/0488; H04N 1/00204; H04N 1/2145; H04N 5/23216; H04N 5/23293
See application file for complete search history.

(56) References Cited

U.S. PATENT DOCUMENTS 8,593,417 B2 * 11/2013 Kawashima ........... G06V 40/28
345/173
9,319,589 B2 4/2016 Kosaka et al.
(Continued)

FOREIGN PATENT DOCUMENTS

JP 2008-294704 A 12/2008

OTHER PUBLICATIONS

Extended European Search Report dated Oct. 21, 2014 in Patent Application No. 14170677.0.

*Primary Examiner* — Amy R Hsu
(74) *Attorney, Agent, or Firm* — Xsensus LLP

(57) ABSTRACT

An image capturing apparatus that includes one or more image sensors configured to capture a plurality of images and store the captured images in a memory. The apparatus also includes a circuitry that detects an input trigger and continues to capture new images in response to the trigger. The numbers of new images captured are equal in magnitude to half the magnitude of the capacity of the memory. The first new image captured after detecting the trigger is tagged as a reference image. In response to the number of new images captured, the sensors are deactivated and the reference image is displayed immediately on a display panel. On detecting an input operation, the apparatus displays a target image from the plurality of images captured in a quick and efficient manner.

17 Claims, 21 Drawing Sheets

Related U.S. Application Data continuation of application No. 16/532,508, filed on Aug. 6, 2019, now Pat. No. 10,812,726, which is a continuation of application No. 15/081,230, filed on Mar. 25, 2016, now Pat. No. 10,419,677, which is a continuation of application No. 13/907,214, filed on May 31, 2013, now Pat. No. 9,319,589.

(51) Int. Cl.
  *G06F 3/0488* (2022.01)
  *H04N 1/00* (2006.01)
  *H04N 23/62* (2023.01)
  *H04N 23/661* (2023.01)

(52) U.S. Cl.
  CPC ........... *H04N 1/2145* (2013.01); *H04N 23/62* (2023.01); *H04N 23/661* (2023.01)

(56) References Cited

U.S. PATENT DOCUMENTS

| | | |
|---|---|---|
| 2006/0034600 A1 | 2/2006 | Wang |
| 2008/0088583 A1 | 4/2008 | Cho et al. |
| 2008/0129854 A1* | 6/2008 | Onoda ................ H04N 1/2145 348/E9.01 |
| 2009/0002335 A1* | 1/2009 | Chaudhri ................ G06F 16/44 345/173 |
| 2010/0123734 A1* | 5/2010 | Ozawa .................. G06F 3/0488 345/173 |
| 2010/0125786 A1 | 5/2010 | Ozawa et al. |
| 2011/0025711 A1* | 2/2011 | Doi ..................... G06F 3/04883 345/635 |
| 2011/0149138 A1 | 6/2011 | Watkins et al. |
| 2011/0243397 A1 | 10/2011 | Watkins et al. |
| 2012/0056878 A1 | 3/2012 | Miyazawa et al. |
| 2012/0066627 A1* | 3/2012 | Furukawa ............. G06F 3/0488 715/768 |
| 2012/0081317 A1* | 4/2012 | Sirpal ................... G06F 1/1647 345/173 |
| 2012/8081317 | 4/2012 | Sirpal et al. |
| 2012/0106852 A1 | 5/2012 | Khawand et al. |
| 2012/0198386 A1* | 8/2012 | Hautala ............... H04N 23/632 715/838 |
| 2012/0206481 A1* | 8/2012 | Endo .................... G06F 3/0482 345/619 |
| 2012/0311499 A1 | 12/2012 | Dellinger et al. |
| 2013/0120240 A1 | 5/2013 | Hong |
| 2013/0296116 A1 | 10/2013 | Hepworth et al. |
| 2013/0293672 A1* | 11/2013 | Suzuki .................... G06F 3/041 345/647 |
| 2014/0354845 A1 | 12/2014 | Molgaard et al. |
| 2015/0365591 A1* | 12/2015 | Aronsson ................ G06T 7/20 348/239 |

* cited by examiner

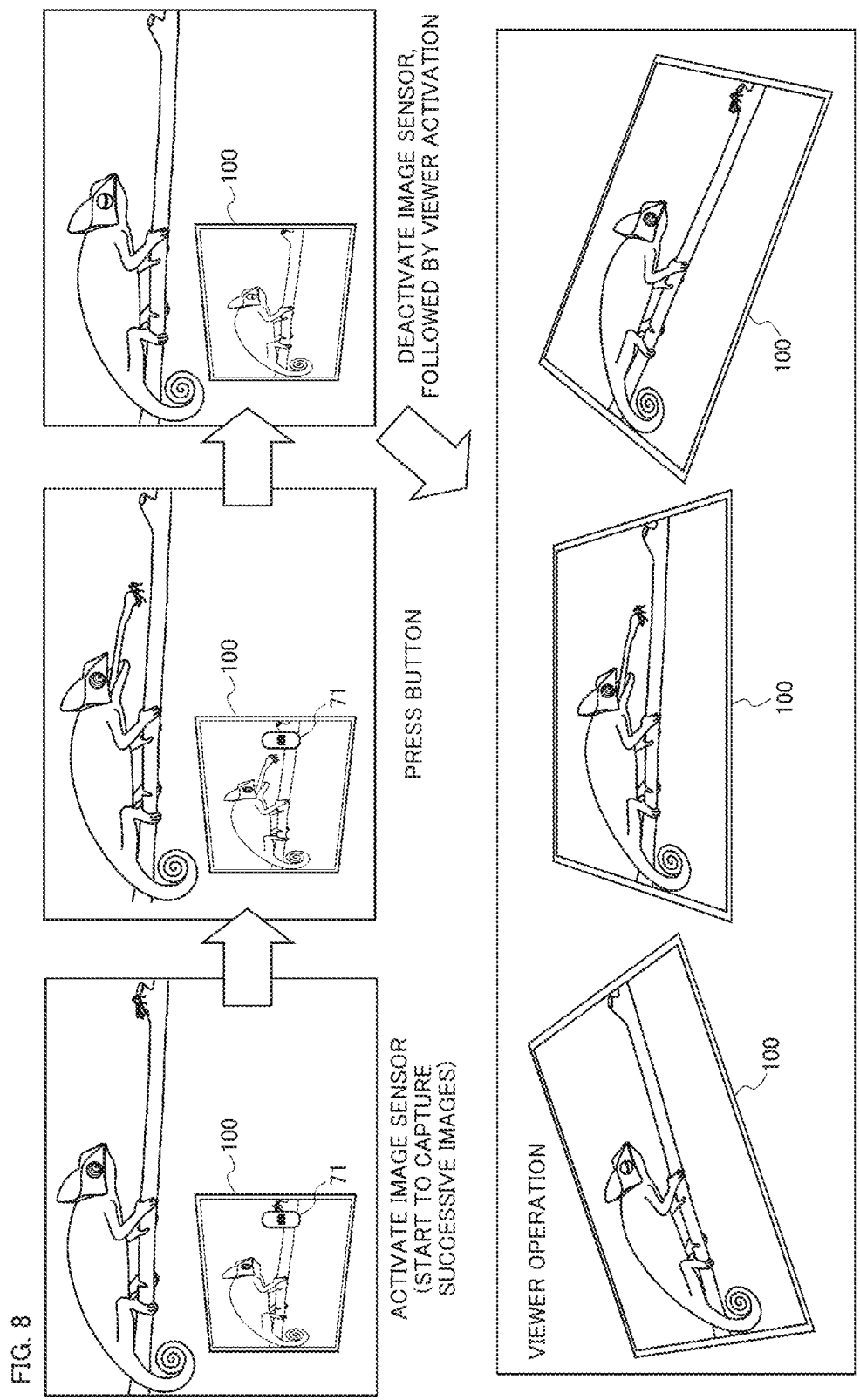

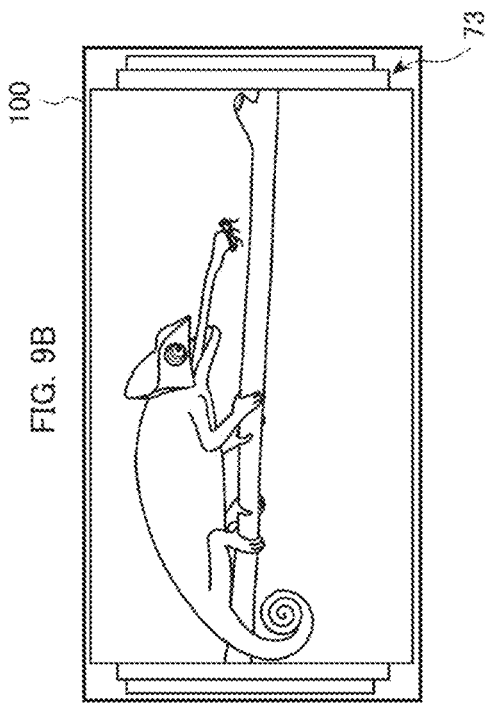
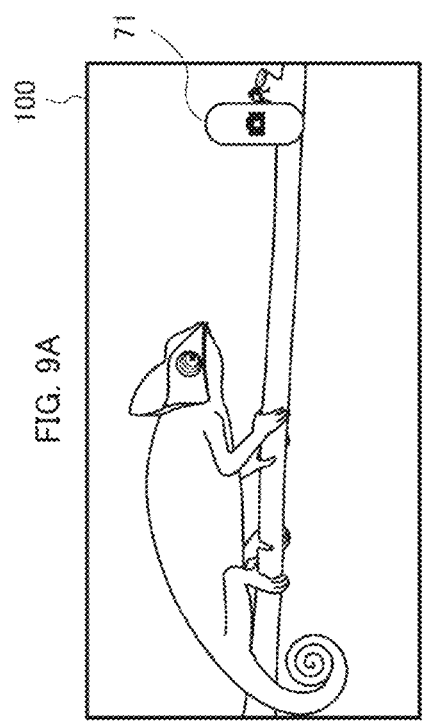

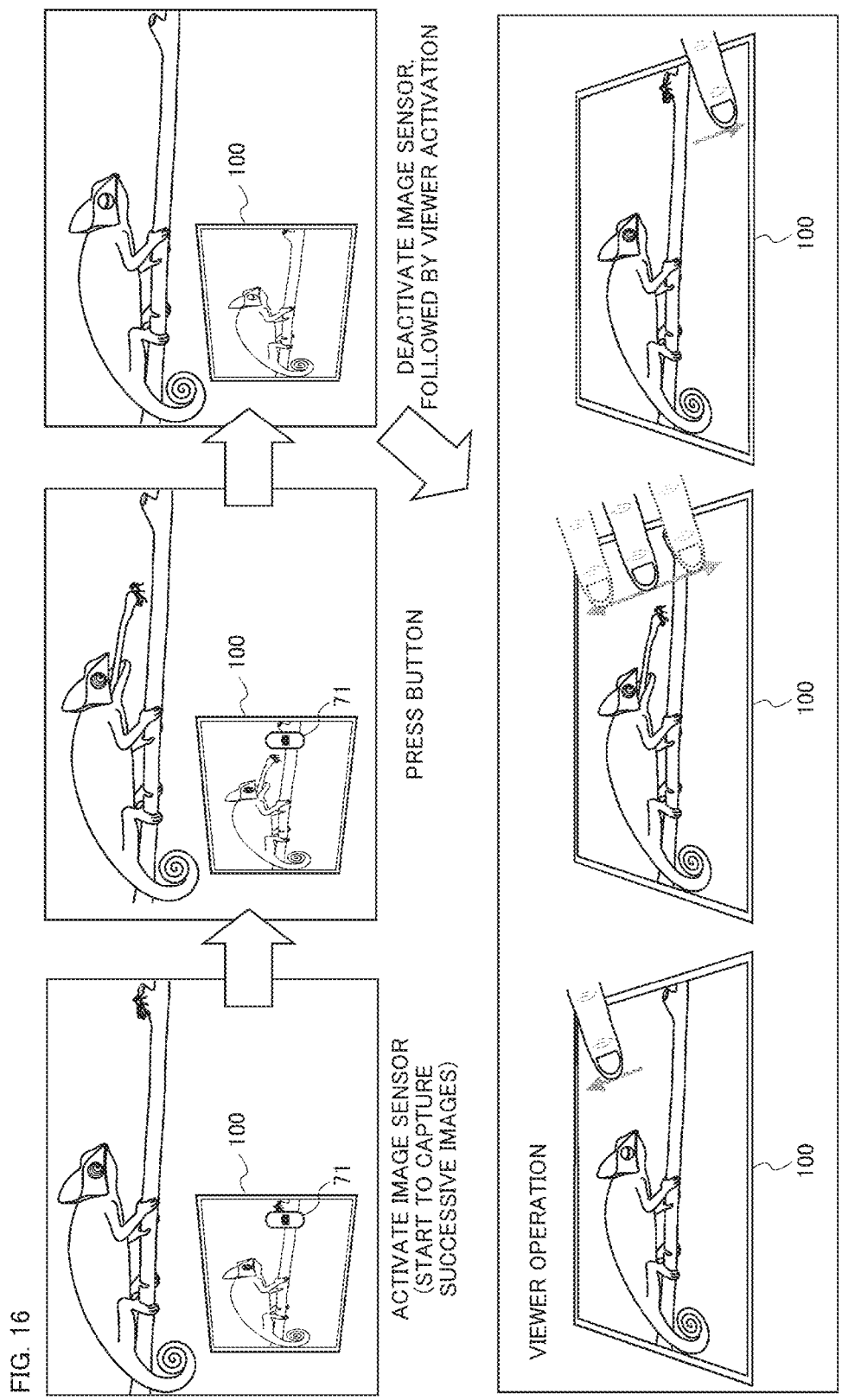

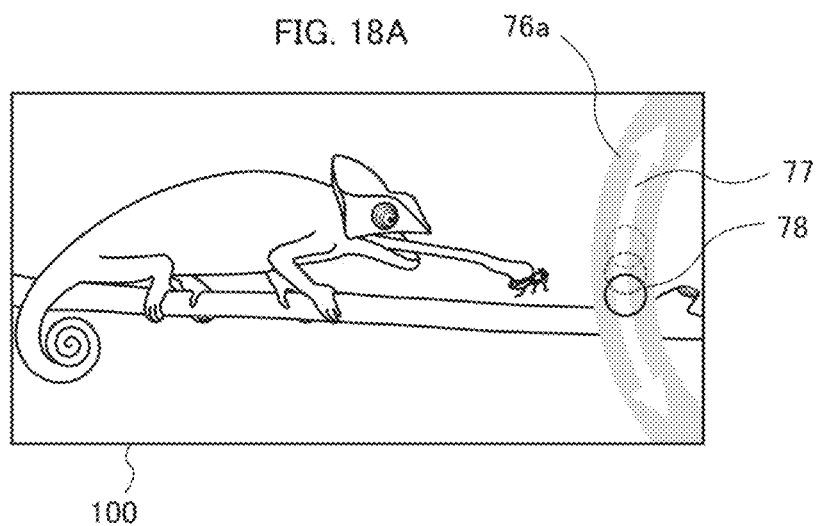
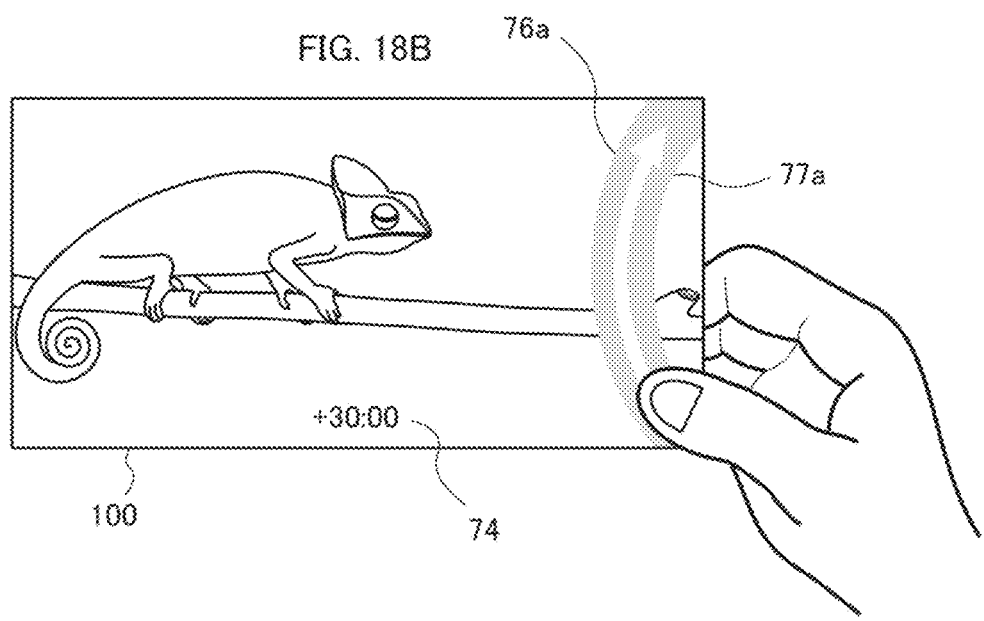

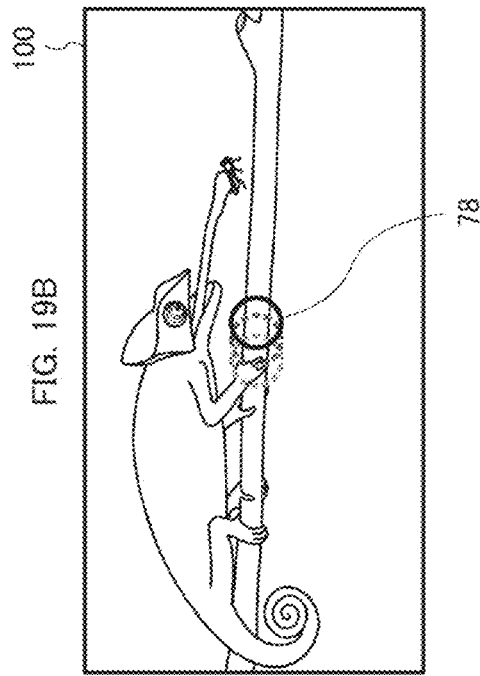
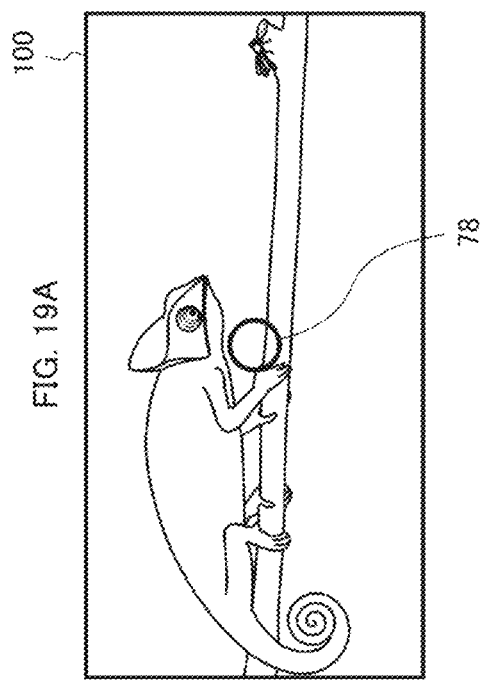
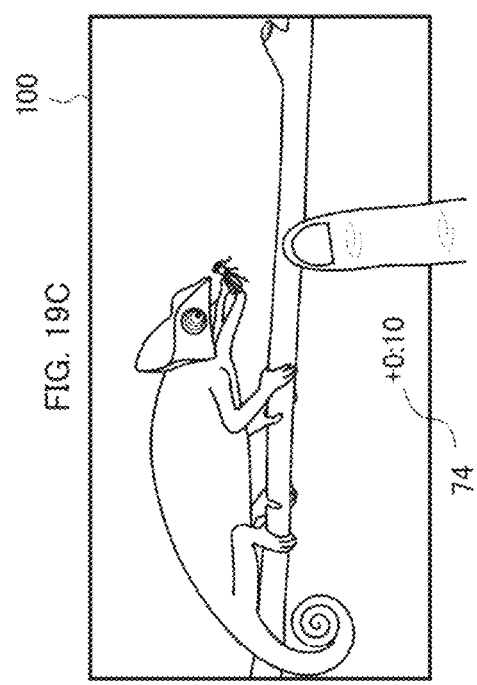

DEVICE AND METHOD FOR CAPTURING IMAGES AND SWITCHING IMAGES THROUGH A DRAG OPERATION

CROSS-REFERENCE TO RELATED APPLICATIONS

This application is a continuation of U.S. application Ser. No. 17/060,105, filed Oct. 1, 2020, which is a continuation of U.S. application Ser. No. 16/532,508, filed Aug. 6, 2019, (now U.S. Pat. No. 10,812,726), which is a continuation of U.S. application Ser. No. 15/081,230, filed Mar. 25, 2016, (now U.S. Pat. No. 10,419,677), which is a continuation of U.S. application Ser. No. 13/907,214, filed May 31, 2013 (now U.S. Pat. No. 9,319,589), the entire contents of each are incorporated herein by reference.

BACKGROUND

Field of the Disclosure

This disclosure relates to a method of capturing a series of successive images and efficiently selecting a desired image from the series of captured images.

DESCRIPTION OF THE RELATED ART

Mobile devices, such digital still-cameras, phones and tablets are examples of devices that are adapted to capture a series of images and perform certain processing based on a user's input.

Traditionally, while using such devices, it is not easy to capture a photograph of an image at a desired time instant. This occurs primarily due to the inherent time-lag in a user's operation such as activating a shutter control or the like. Furthermore, a delay associated with the processing of an image makes it difficult for the user to capture the desired image at a certain time instant. Thus, a series of images is usually captured in a fixed time interval which starts before activating a shutter operation and ends at a pre-determined time after the activation of the shutter button. The images captured in this manner are then displayed in a pre-determined fashion (either displaying the last image captured or the first image captured of the series of images) and a particular image is selected based on the user's input.

However, to select the desired image, a series of complicated user instructions is usually performed. The selection process may be time-consuming and thus provides a discontented experience to the user. Accordingly, there is a requirement to select a desired image from a series of images in an efficient and rapid manner.

SUMMARY

Devices and methods for successively capturing a plurality of continuous time-stamped images and efficiently selecting a desired image from the plurality of images are discussed herein.

According to one exemplary embodiment, the disclosure is directed to an image capturing apparatus comprising: comprising: one or more image sensors configured to capture a plurality of images at a capture rate; a memory configured to store the plurality of captured images; and circuitry configured to: detect an input trigger, capture a number of new images in response to detecting the input trigger, the number of new images being equal to a predetermined value, tag a first image, of the number of new images captured after detecting the input trigger, as a reference image, deactivate the sensor in response to capturing the number of new images, and control a display panel to display the reference image in response to deactivating the sensor.

According to another exemplary embodiment, the disclosure is directed to a method performed by an image capturing apparatus, the method comprising: capturing, by one or more image sensors, a plurality of images at a capture rate; detecting, by circuitry, an input trigger and continuing to capture a number of new images following the input trigger detection, the number of new images being equal to a predetermined value; tagging, by the circuitry, a first image, of the number of new images captured after the detecting, as a reference image; deactivating, by the circuitry, the one or more image sensors in response to capturing the number of new images; and controlling a display panel, by the circuitry in response to deactivating the one or more sensors, to display the reference image thereon.

According to another exemplary embodiment, the disclosure is directed to a non-transitory computer-readable medium including instructions stored therein, which when executed by one or more processors, cause the one or more processors to execute a method comprising: capturing, by one or more image sensors, a plurality of images at a capture rate; detecting, by circuitry, an input trigger and continuing to capture a number of new images following the input trigger detection, the number of new images being equal to a predetermined value; tagging, by the circuitry, a first image, of the number of new images captured after the detecting, as a reference image; deactivating, by the circuitry, the one or more image sensors in response to capturing the number of new images; and controlling a display panel, by the circuitry in response to deactivating the one or more sensors, to display the reference image thereon.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

FIG. 8 illustrates an exemplary switching operation performed to select a desired image from a series of continuous images;

FIG. 9A and FIG. 9B show a non-limiting example of images displayed on the display panel during a capturing mode;

FIG. 16 shows an exemplary interface to select a desired image according to a another embodiment of the present disclosure;

FIG. 18A and FIG. 18B show another exemplary touch operation to select a desired image;

FIGS. 19A-19C show another example depicting a touch operation to select a desired image from a series of captured images;

DETAILED DESCRIPTION

Figure 1:
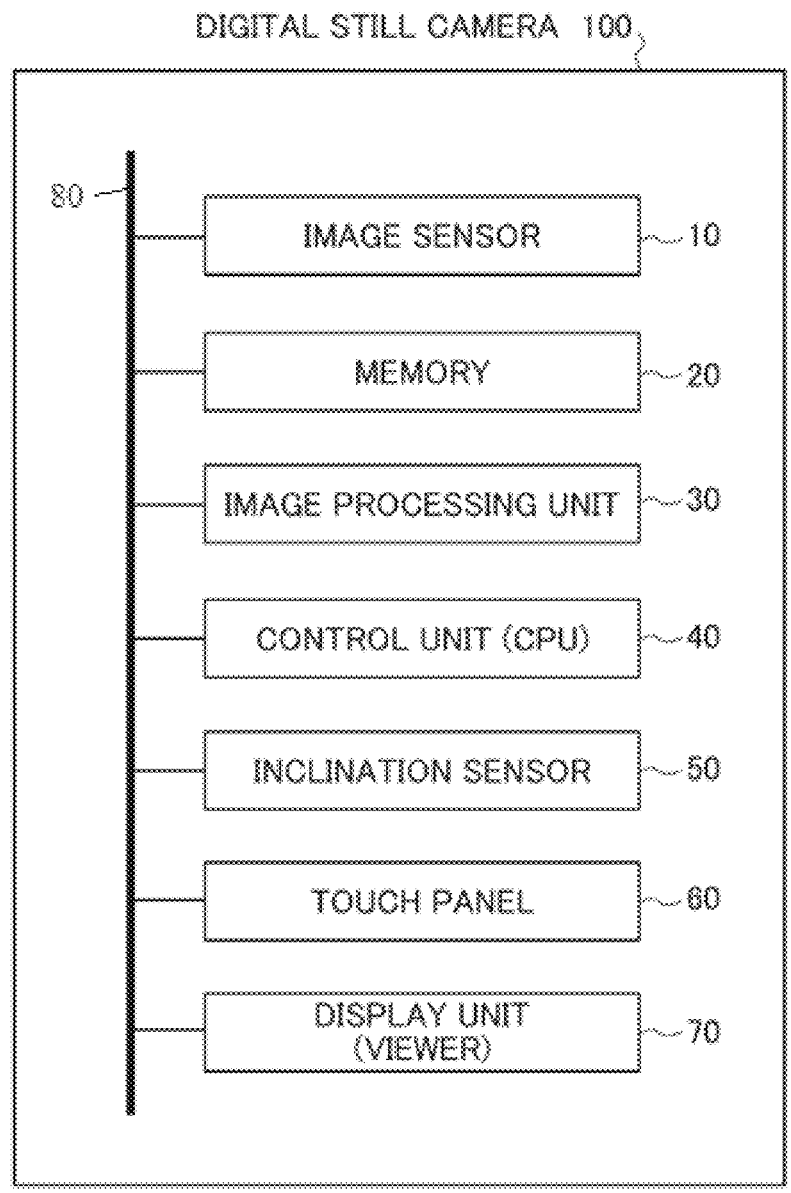
FIG. 1 illustrates schematically an exemplary digital camera device.

Referring now to the drawings, wherein like reference numerals designate identical or corresponding parts throughout the several views.

FIG. 1 illustrates schematically an exemplary digital camera device 100. The digital camera 100 can include an image sensor 10, a memory 20, an image processing unit 30, a control unit 40, an inclination sensor 50, a touch panel 60, a display panel 70, and a communication bus 80.

The image sensor 10 may include an optical lens and an image pickup element such as a CMOS sensor or a charged coupled device (CCD) sensor. The image sensor projects the image of the object to be photographed by using an optical lens that passes the image onto an image pickup element and acquires the data thereof.

The control unit 40 may comprise one or more processors that control each element of the digital camera device 100 based on data detected either by a touch panel 60 or an input received from the inclination sensor 50. Thus, the inclination sensor and a touch sensor (configured to detect a touch on the touch panel 60) provide various interfaces to accept input commands in order to perform some processing on the images that are captured by the camera device 100. The controller may further execute instructions stored in memory 20 wherein the memory 20 may be a non-transitory computer-readable medium having instructions stored therein for controlling the camera device 100. Further, the controller may utilize one or more processors for executing the instructions that are stored in memory 20. The control unit may also be configured to perform functions on captured images such as an autofocus function (AF) or an auto exposure function (AE).

According to an embodiment of the present disclosure the image sensor 10 may include a function which enables the camera device 100 to capture a series of images at a fixed frame (image) rate in a fixed total of time. The memory unit 20 can include an image memory which is utilized to store the data of the images captured by the image sensor 10. Further, the memory 20 may also include a dedicated memory unit that stores a computer program that is used by the control unit 40 in processing a certain set of instructions. According to an embodiment of the present disclosure, the image memory may be a buffer memory such as a ring buffer which stores image frames in a sequential cyclic manner. Further, the image memory may be a nonvolatile memory such as a read-only memory (ROM), a flash memory, a ferroelectric RAM (FRAM) or the like.

The image processing unit 30 performs storage functions, readout functions, or the like to memory unit 20, of image data that is captured by the image sensor 10. Accordingly, the image processing unit 30 can also display the captured image onto the display unit (viewer) 70. The control unit 40 is a central processing unit (CPU), that performs the overall control and management of the digital still camera device 100. The CPU achieves the desired control and process by reading and executing the computer program that is stored in memory 20.

The inclination sensor 50 detects an inclination of the camera device 100 (e.g., as a result the inclination of the display panel 70) and may be a triaxial acceleration sensor, a gyro, a tilt meter, a tilt indicator, a slope sensor, a gradient meter or the like. According to an embodiment of the present disclosure the inclination sensor 50 is configured to measure inclinations (tilts) in both the positive and the negative direction (to be described later with reference to FIG. 7).

The camera device 100 may include a display unit, 70. The display unit 70 may be, for example, a liquid crystal display (LCD) panel, an organic electroluminescent (OLED) display panel, a plasma display panel or the like. The display unit 70 may display an image that is captured by the image sensor or may also be configured to function as a viewfinder which displays the image of an object to be photographed.

The digital camera device 100 may include a touch panel 60 that can detect a touch operation on the surface of the display 70. For example, the touch panel 60 can detect a touch operation performed by an instruction object such as a finger or a stylus. Touch operations may correspond to a user's input such as a selection of an icon that is displayed on the display panel 70. The touch panel 60 may be an electrostatic capacitance type device, a resistive type touch panel device or other such type of devices that are used for detecting a touch on the display panel.

The touch panel 60 may perform processing related to touch operation classification. For example, the touch panel 60 may assign a predetermined function to be performed when a tap operation is detected. Similarly, the touch panel unit may analyze a touch operation in which the instruction object makes continuous contact with the display panel 70 while moving the instruction object around the display, e.g., a swipe or a drag operation. The touch panel 60 may output a signal based on a classification of the touch operation performed. The signal may, for example, include information indicating the touch operation classification, the location on the display panel 70 where the touch operation was performed and the operation to be performed based on the touch operation. Alternatively, the touch panel 60 may also be configured to detect an intensity of a user's touch and to use the corresponding intensity to select a particular image from a series of time-stamped images. The digital still camera device 100 can include a communication bus 80 that may include a control line (CL) and a data line (DL) as internal bus lines for communication. The CL can be used to transmit control data from the control unit 40. The DL may be used for transmission of data corresponding to an image or the like, throughout the various elements of the camera device 100.

The digital still camera device 100 may optionally include a short distance wireless communication unit. The short distance wireless communication unit may enable the camera device 100 to communicate wirelessly with other devices over a network such as the internet, a local area network or a wide area network (WAN). The communication unit may include an antenna such as a Wi-Fi transceiver to achieve wireless connectivity. The wireless connectivity enables the camera device 100 to transfer a selected (desired) image captured by the image sensor to another mobile device or a laptop device or the like. Note that the imaging device as described above is not restricted necessarily to a digital still camera. For example, portable devices, such as a smart phone, a tablet device or the like that include the functionality of the above described digital camera may also suffice.

Figures 2A, 2B, 2C, 2D, 2E, 2F, 2G:
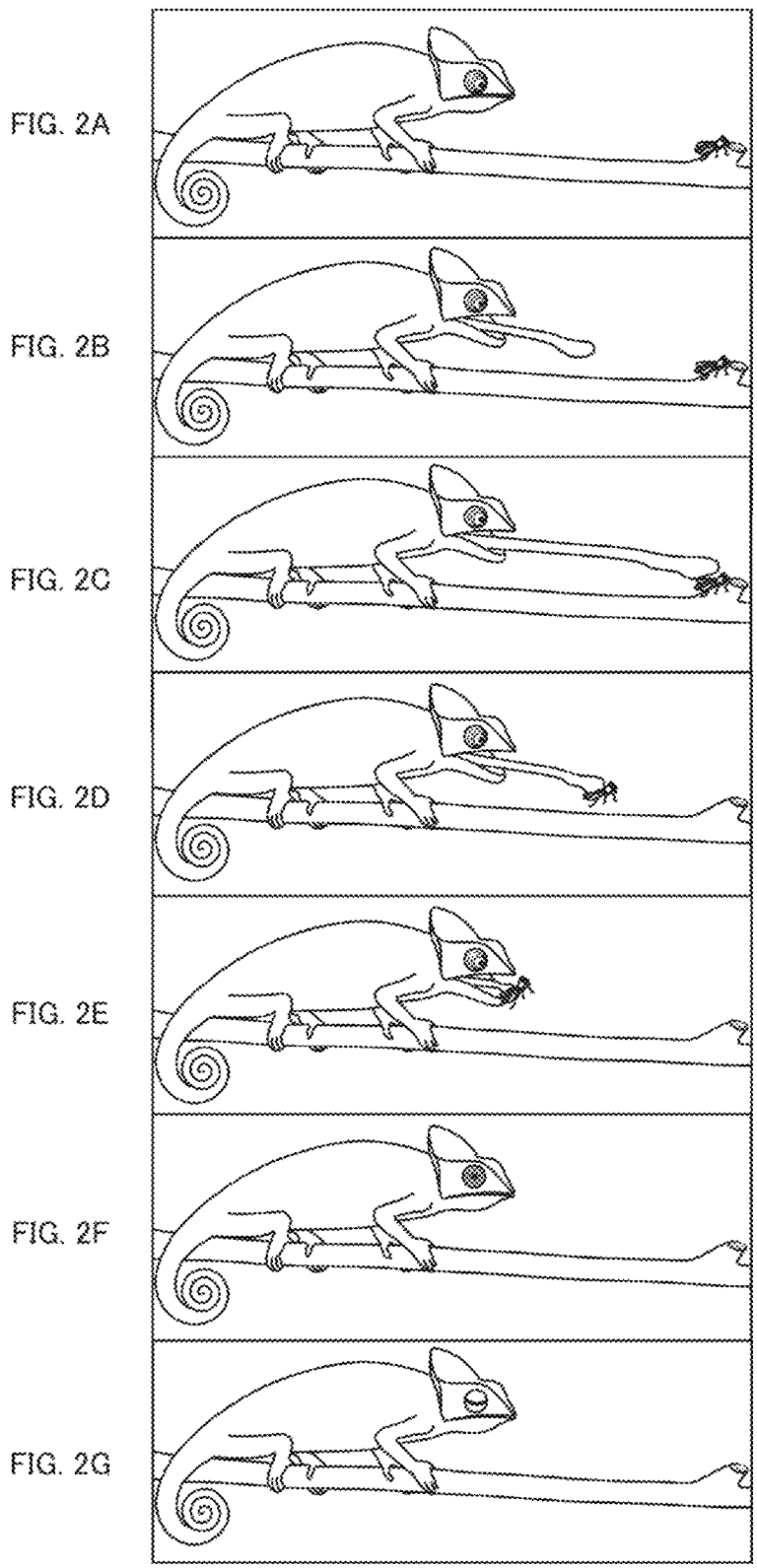
FIG. 2A-FIG. 2G illustrate a non-limiting example depicting a series of time dependent images.

FIG. 2A to FIG. 2G illustrate a non-limiting example depicting a series of images that are captured by the camera device 100 in a fixed interval of time. Specifically. FIGS. 2A to 2G depict a chameleon preying on an insect. While capturing images, wherein the object continuously changes with respect to time, it is usually difficult to capture the object at a decisive instant of time. For example, it is typically difficult to capture an image that depicts the chameleon preying on the insect as shown in the image of FIG. 2C. Furthermore, even if a series of images are captured wherein one of the images corresponds to the desired image, it is typically very cumbersome to select the desired image from the series of images. This usually requires many input instructions to select the desired image. Note that the object to be photographed is moving with respect to the still camera (high-speed movement). In what follows, the example of the chameleon is used to explain various embodiments of the present disclosure. Note that the example of the chameleon is in no way limiting the scope of the present disclosure. Specifically, a high-speed image processing capability of the digital still camera device 100 may be applicable to any photographed object.

Figure 3:
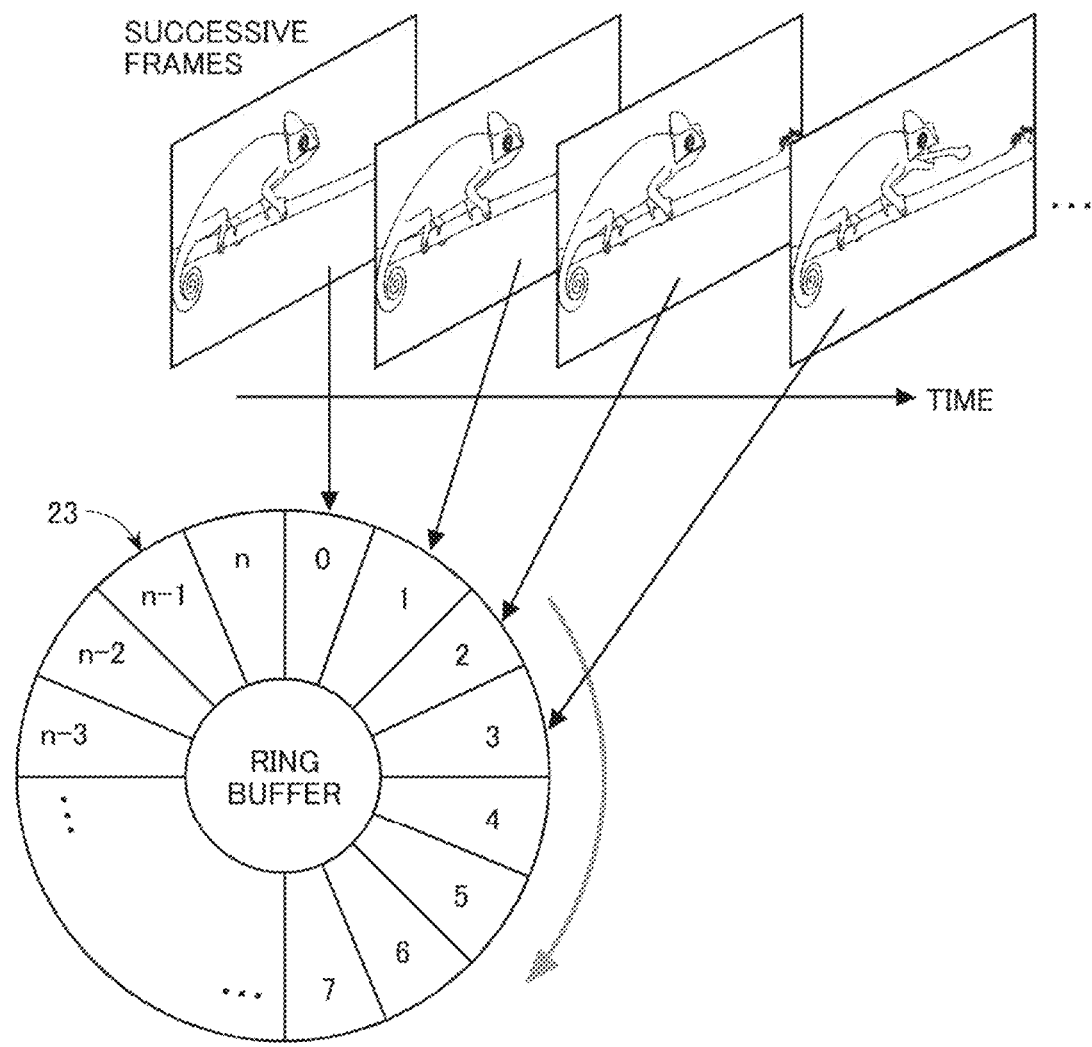
FIG. 3 illustrates an exemplary ring buffer memory according to one aspect of the present disclosure.

FIG. 3 illustrates an exemplary ring buffer memory 23 according to an embodiment of the present disclosure. The ring buffer memory 23 is a circular shaped memory unit which including n-memory slots, each capable of storing one frame of the captured image. The value of n is preferably a positive integer that is greater than 3; however, the skilled artisan may select other values of n depending on, e.g., particulars of an application. When digital still camera device 100 is in an imaging capture mode the device continuously captures a sequence of images according to a predetermined frame rate. For the sake of simplicity a frame rate of 30 frames per second is assumed. Corresponding to this frame rate the value of n should be 60 memory slots or more in the present example. This corresponds to a length of time equal to 2 seconds or more. Specifically, the capacity of the ring buffer memory 23 should be such that it has a number of slots equal to at least twice the magnitude of the frame capture rate.

In the capture mode the successive images of the photographed object are stored sequentially (one by one) in the ring buffer memory 23. Further, note that if the capture mode is performed for a time which is greater than the length of n slots of the ring buffer memory 23, the new images may be overwritten into the past stored images.

In what follows the example described in FIG. 3 is used to explain how a user operation (e.g., pressing of a shutter button, a release button or the like) is used in capturing images. Further, the user's trigger (e.g., the shutter operation) may originate by the user touching a specific button displayed on the touch screen. However, the user's trigger is not restricted simply to a touch operation. Any mechanism that corresponds to a user initiating a shutter operation will be sufficient.

Figure 4:
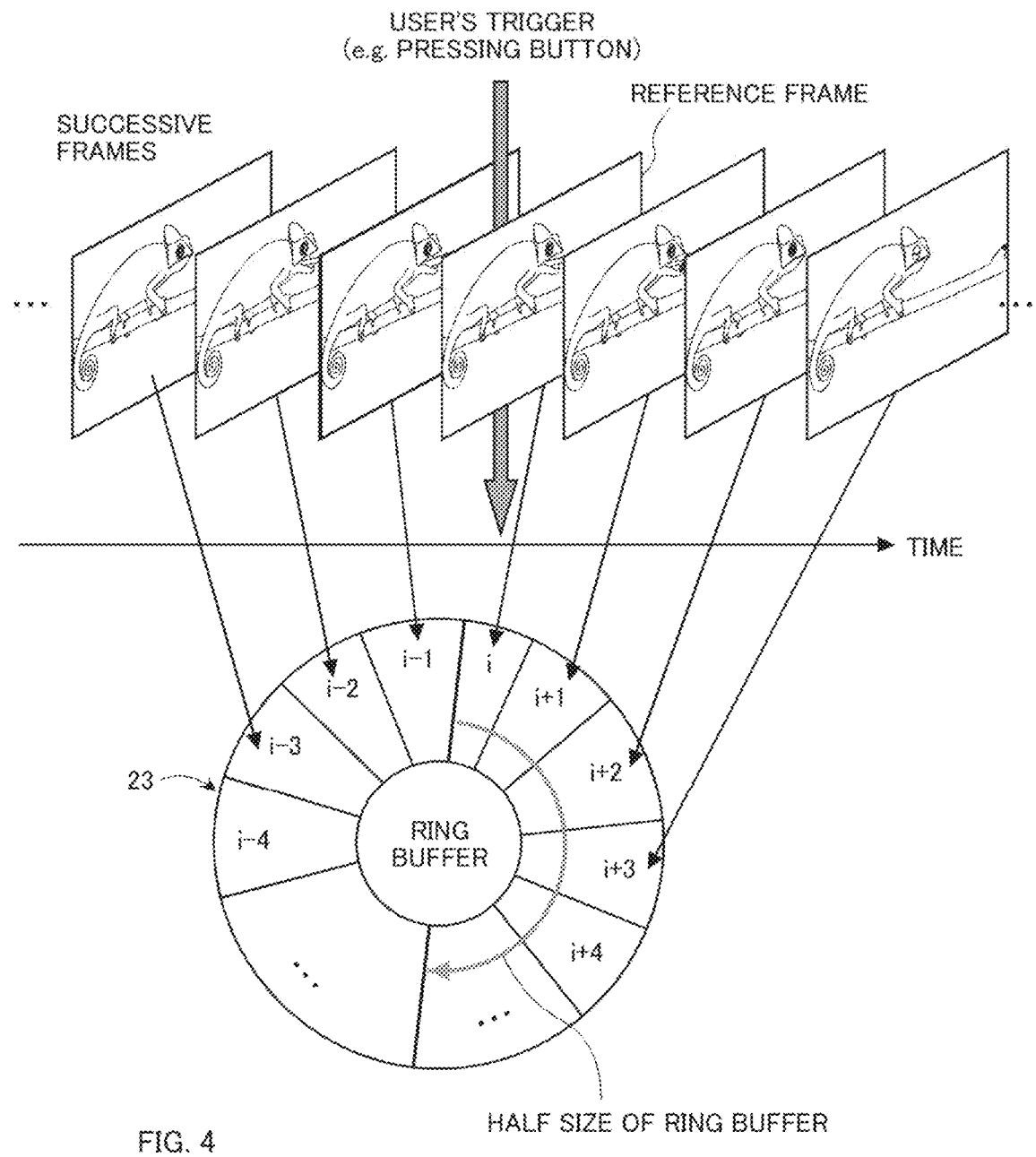
FIG. 4 illustrates a triggering operation performed on the camera device.

FIG. 4 illustrates an example in which the initiation of a triggering operation that is performed while using the camera device 100. FIG. 4 depicts a series of successive frames (images) that are stored in each memory slot of the ring buffer memory 23. Upon a trigger being initiated, the image that is captured immediately after the trigger is tagged as a reference frame. Specifically, the first image acquired after pressing the shutter button is referred to as a reference image and the corresponding frame is called as a reference frame. For example, referring to FIG. 4, the image stored in slot 'i' is the reference frame. Note that even after the initiation of the triggering operation the capture mode of the camera device 100 is continued until the number of memory slots greater than n/2 are filled by newly captured images. Specifically, the image sensor is kept on after the triggering operation to continue capturing images. In the example of FIG. 4, the imaging operation is kept on until slot 'i' to 'i+(n/2)−1' are filled. Accordingly, the frames that were captured before the user's trigger operation are stored at memory locations 'i−1', 'i−2' and so on. Further, when the capture mode is completed (when n/2 slots after the trigger operation have been filled) the reference frame is automatically displayed on the display unit 70 of the camera device 100.

It is important to note that the initiation of a trigger operation may correspond to an instant of time wherein a desired image of the time-dependent object is to be captured. Further, initially displaying the reference image increases the possibility that the desired image is within a few images that are either captured earlier or later than the reference image. Hence few input operations are required to display the desired image. Contrary to this approach, typically, a series of images are captured by an imaging device and either the last image captured or the first image captured is displayed first. This results in many complicated input operations (such as continuously pressing a button to scroll through the images) to be performed in order to display the desired image.

Figure 5:
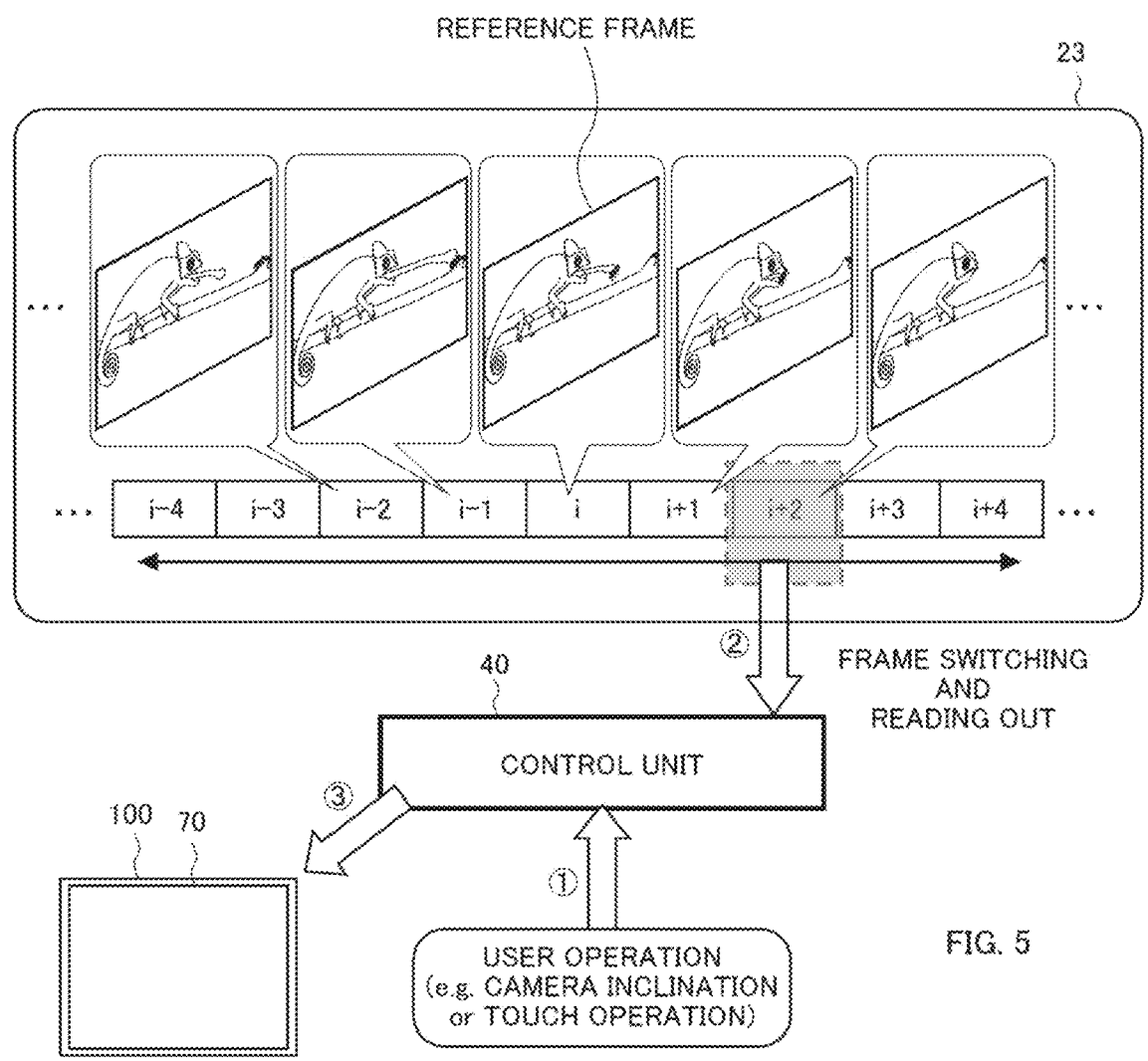
FIG. 5 shows a non-limiting example depicting a user interface that is used to select a desired image.

FIG. 5 shows a non-limiting example depicting a user interface for selecting a desired image(s) from a series of captured images, and displaying the desired image(s) on the display panel.

FIG. 5 depicts a series of images that are stored at memory locations 'i−4', 'i−3', 'i−2' . . . 'i+1', 'i+2', 'i+3', 'i+4' and so on. Note that the image stored in memory location 'i' has been tagged as a reference frame. This corresponds to a trigger operation which is initiated at an instant of time, when the previously captured image was stored in memory location 'i−1'. Hence the images which are stored in slots 'i', 'i+1', 'i+2' and so on are the images which are captured after the trigger operation was initiated. The images which are stored at locations 'i−1', 'i−2' and so on are the images that are captured before the trigger operation was initiated.

Upon completion of the capture mode, which corresponds to a an instant of time wherein n/2 new image frames have been captured, the control unit 40 reads the image which is tagged as a reference image and immediately displays the reference image on the display unit 70. Further, based on several user interfaces (UI) such as a tilt sensor that is configured to detect an inclination of the camera device (e.g., inclination sensor 50), or a touch panel which is configured to detect an input touch operation (e.g., touch panel 60), a desired image can be selected and correspondingly displayed on the display unit 70. Specifically, the input operation (e.g., touching or inclining the device based on a reference frame) is detected by the control unit 40. Upon detecting the input operation, the frame is switched and a target frame (in this example frame i+2) is read out and displayed on the display panel 70. In what follows, several input operations to select a desired image out of a series of images and to correspondingly display it on the display unit 70 are described.

Figure 6:
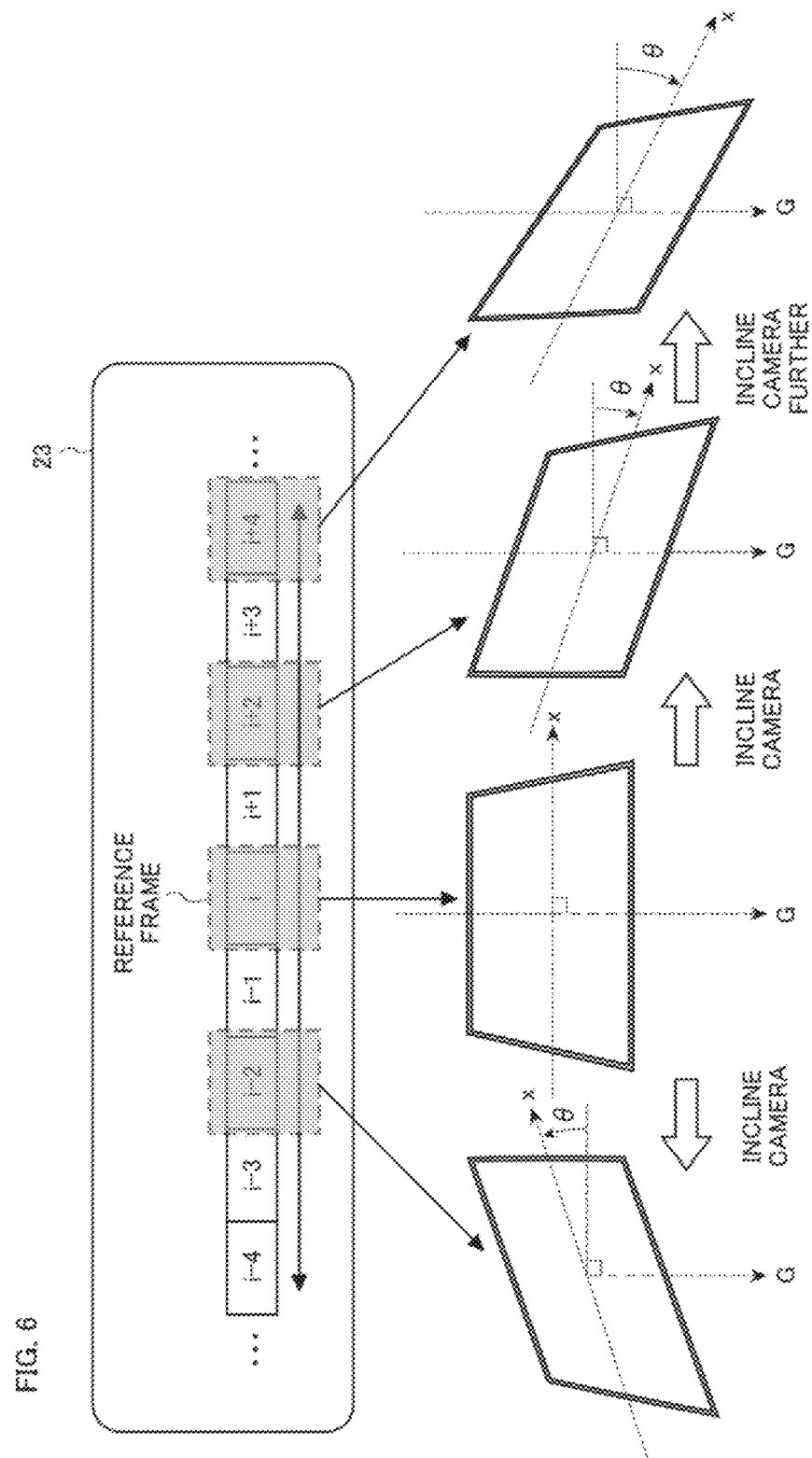
FIG. 6 shows an input operation to select a desired image according to an embodiment of the present disclosure.

FIG. 6 depicts, according to an embodiment of the present disclosure, an exemplary inclination operation performed on the camera device 100 to select a desired image from a series of captured images. As shown in FIG. 6 a series of images are stored in the ring buffer memory 23, with reference frame 'i' indicating the frame that is captured immediately after the triggering operation was performed. Assuming an initial horizontal position of the camera device, image frame 'i' is depicted immediately on the display unit 70 upon the completion of the capturing mode. Further, to select, for instance, frame image i+2, the camera device is inclined (e.g., in the rightward direction) and the corresponding image that is stored at memory location 'i+2' can be selected to be displayed on the display unit 70 based on the direction of the inclination. Similarly, upon further inclining the camera device 100 at an angle value theta ($\theta$), a corresponding image frame 'i+4' can be selected to be displayed on the display panel. That is, an image frame of the plurality of image frames stored in the ring buffer memory 23 may be selected for display based, e.g., on the magnitude of the angle $\theta$. For example, due to the images' relative position in the ring buffer memory 23, the corresponding angle of inclination for image 'i+4' may be greater than the corresponding angle of inclination for image 'i+2'.

Consequently, tilting the camera device 100 in the opposite direction (e.g., leftward direction) for this example may result in an image that is stored at location 'i−2' being selected and displayed on the display unit 70. Note that the images corresponding to locations 'i−1', 'i−2' and so on, are images that are captured prior to the initiation of the triggering operation. The inclination angle ($\theta$) may be computed by the control unit 40 based on a certain set of 3-dimensional axes described with reference to FIG. 7.

Figure 7:
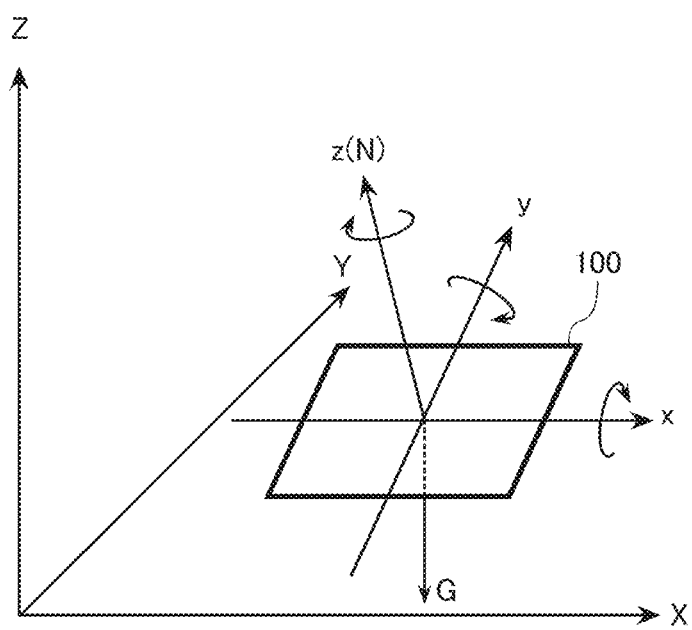
FIG. 7 shows an exemplary three-dimensional coordinate axis of the camera device and a corresponding three dimensional reference axis system.

FIG. 7 depicts an exemplary 3-dimensional coordinate axis of the camera device 100 (i.e., axes x, y, z), and also depicts a corresponding 3-dimensional reference axis system (X, Y, Z) of the real space surrounding the camera device 100.

The local axes x, y, z of the camera device 100 are defined as follows: an axis x is an axis that is generally parallel to the direction along the long side of the display screen. Similarly, axis y is defined as an axis that is generally parallel to the direction along the short side of the display screen. The axis z is an axis which is orthogonal to the x and y axes. This is depicted as z(N) in FIG. 7. Further, axis G depicts an axis that generally points towards the center of gravity of the camera device 100 (gravity vector).

According to one embodiment of the present disclosure, either the x axis or the y axis can be used to detect the inclination of the camera device 100 with regard to the gravity vector G. Usually there exists a landscape to which either the x axis becomes horizontal or the y axis becomes horizontal. The axis which is horizontal among the x and the y axes at the time of image capturing is referred to as axis h. Further, the inclination of the camera device 100 (eventually the inclination of the display panel 70) can be devised based on the axis h and the gravity vector G.

Referring back to FIG. 6, note that in the example of FIG. 6 the axis x is judged to be axis h. Further, the angle that the straight line axis h makes to the gravity vector G is denoted as $\theta$ in FIG. 6.

Further, the camera device 100 can be configured such that an initial horizontal position (when the reference image is displayed) corresponds to a 0° movement. Consequently, if the camera device 100 is inclined in a rightward direction, it results in the angle value of $\theta$ to be a positive value greater than 0°. This may correspond to a clockwise angle of the camera device.

Conversely, if the camera is inclined in a leftward direction, the $\theta$ value assumes a negative value which is lower than 0°. This corresponds to an anti-clockwise angle motion of the camera device 100. Further, note that the computation of angle $\theta$ is not limited to the above-description of the local axes x, y, and z. In other words, the inclination angle $\theta$ can also be computed with reference to a 3-dimensional reference axis system (X, Y and Z axes system) that is based on a reference that surrounds the camera device 100.

In the example of FIG. 6 an angle value of $\theta$ equaling 0 corresponds to the reference frame being displayed on the display unit 70. Accordingly, based on the magnitude (and sign of the angle $\theta$) the image frame to be displayed is switched to the frame based on the direction in which the camera device is tilted. Specifically, if the camera device is inclined in a rightward direction, images which are stored in location 'i+1', 'i+2' and so on are consequently displayed on the display unit 70. Contrarily, if the angle $\theta$ assumes values which are lower than 0° (corresponding to a leftward motion of the camera device) image frames 'i−1', 'i−2' and so on are consequently displayed. Note that in the example as described in FIG. 6, there exist a one-to-one relationship between a magnitude of $\theta$ and a corresponding image in the series of captured images.

FIG. 8 illustrates an exemplary switching operation performed to select a desired image from a series of continuous images. Specifically the three upper blocks in FIG. 8 depict the image capturing mode wherein an image sensor is activated to start the capturing mode of acquiring a series of images. Note that the captured images are stored in the memory slot of the frame buffer that is included in the memory unit 20. Upon detection of an input trigger, such as the initiation of a shutter, a predetermined time period starts wherein at least n/2 further new images are captured and stored sequentially in the frame buffer. Upon storing the last image, the image capturing mode is deactivated (image sensor is deactivated) and the viewer (display) mode is activated automatically. The viewer operation is depicted in the bottom half of FIG. 8. In this mode the reference frame is immediately displayed on the display panel 70. Further, according to the present embodiment, upon inclining (tilting) the device, subsequent images may be selected to be displayed on the display panel. Thereby, according to the present embodiment, one of several captured images that are stored in a nonvolatile memory of the memory unit 20 can be selected based on a user's operation to be displayed on the display panel 70.

FIG. 9A depicts an example according to the present embodiment of the disclosure that illustrates a display on the camera device 100 during the capturing mode of the camera device 100. In this capturing mode the display unit 70 can function as a viewfinder.

Specifically, the image that is shot in a fixed time interval is continuously displayed on the display screen. Furthermore, the consequently obtained images are stored in a sequential manner in the ring buffer memory 23. Further, FIG. 9A also depicts a shutter button 71 that is displayed on the display unit 70. By tapping this shutter button 71 a user can generate the shutter operation as described above with reference to FIG. 8. Note that when the shutter operation is initiated the camera device 100 continues the capturing mode and acquires n/2 further new images that are stored in the ring buffer memory 23. It is only upon the completion of capturing the new n/2 frames that the capture mode of the camera device 100 is deactivated. Upon deactivation the view mode of the camera device is automatically triggered wherein the reference frame (as shown in FIG. 9B) is automatically displayed on the display unit 70. Further, in this mode the camera device 100 is also configured to depict an outline of the number of images that are captured by the capturing process. This is denoted as element 73 in FIG. 9B. Alternately, the camera device 100 may also be configured to numerically display a value corresponding to the total number of images that are captured by the capturing mode of the camera device 100.

Figure 10:
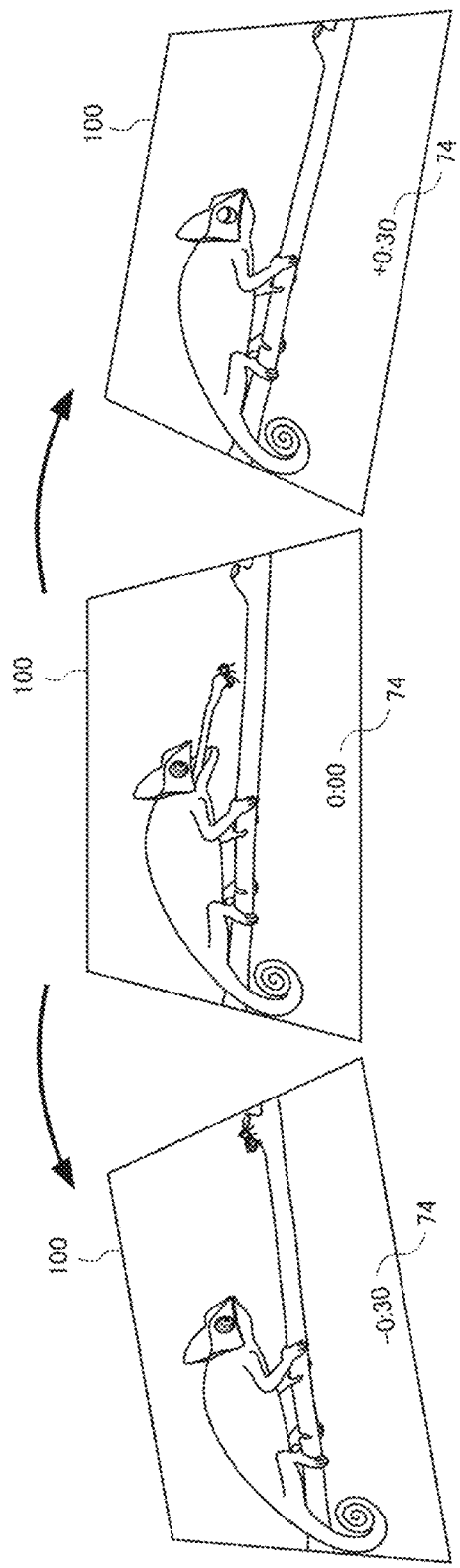
FIG. 10 illustrates an exemplary switching operation performed on the images as depicted in FIG. 9B.

FIG. 10 depicts a non-limiting example in which the switching operation is used to selectively switch one of the several contiguous images and display it on the display panel. Note that the switching operation is described with reference to the state of the camera device as depicted in FIG. 9B. Initially, the display unit 70 displays the reference image. As shown in FIG. 10 the camera device 100 may be configured to display a time-stamp 74, corresponding to an instant in time that the image was captured. According to one embodiment of the disclosure the reference frame is assigned a time value of 0:00. Thereafter, images which are captured after the triggering operation are assigned positive integer values. For example, as shown in FIG. 10, an image which is captured after the triggering operation is denoted by +0:30. Similarly, images that are captured (in the pre-triggering mode) are assigned a time-stamp that has a negative value based on the time-stamp of the reference image value.

Accordingly, by tilting the camera device 100 in either the rightward or the leftward direction a desired image can be selected from the series of images and displayed on the display unit 70. Note that presenting the time-stamp 74 is not essential to the processing of the present disclosure. However, it is a useful parameter that can assign a relationship between the continuous images that are captured by the camera device 100.

Figure 11A:
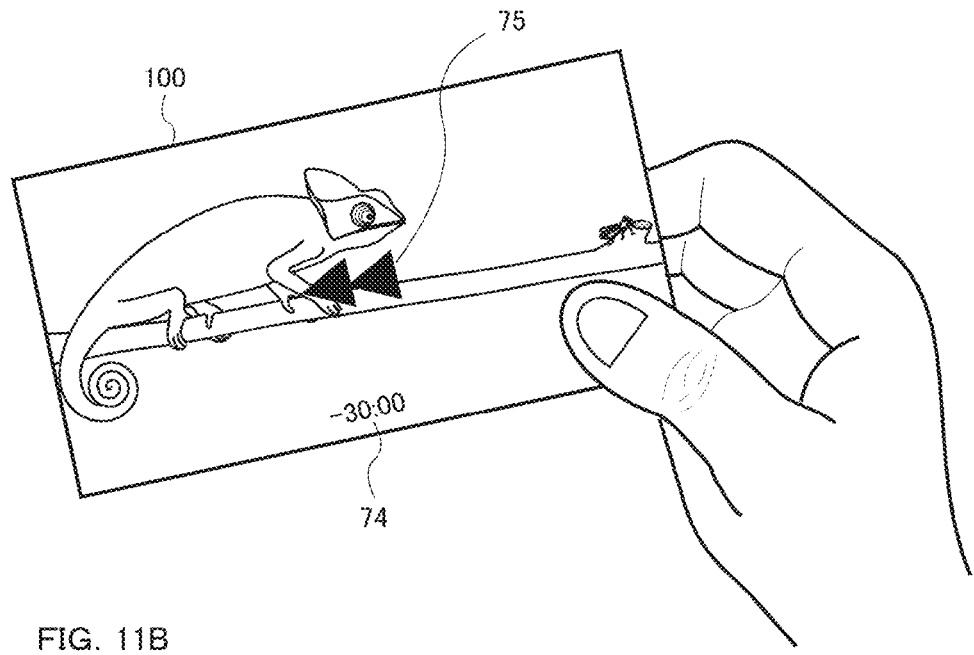
FIG. 11A and FIG. 11B illustrate exemplary direction indicators that are used in a viewing mode of the camera device.
Figure 11B:
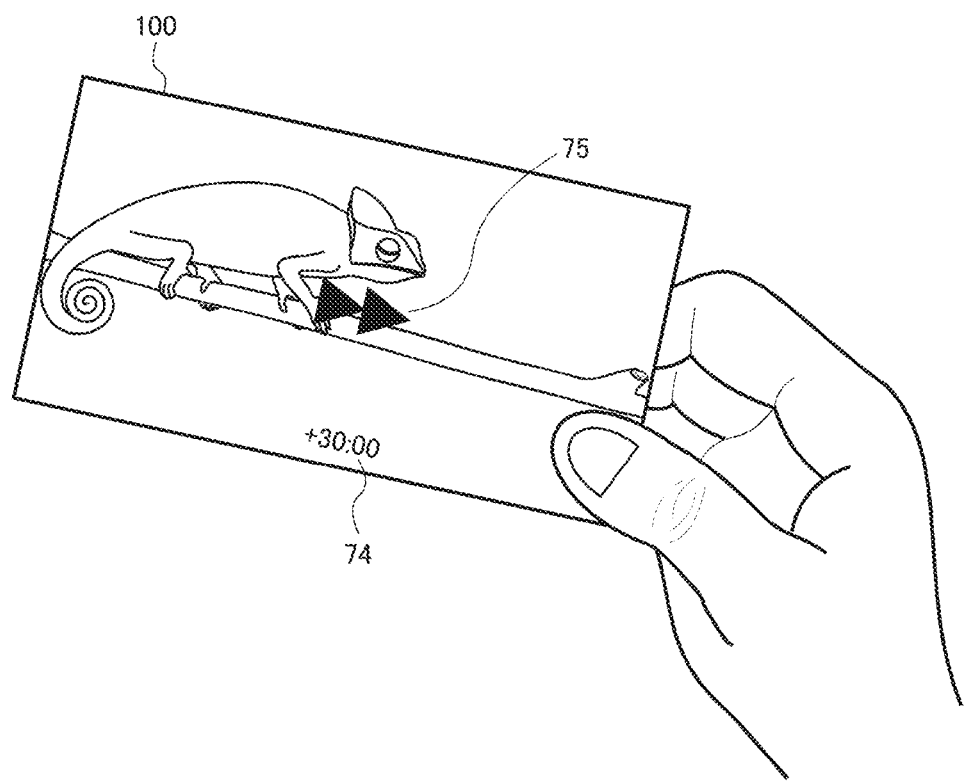

FIGS. 11A and 11B illustrate an example of using direction indicators in the viewing mode of the camera device 100. As described above, by input operation that corresponds to tilting or inclining the device 100, a particular image from a series of images can be displayed on the display panel 70. To further improve the quality of display, a display icon 75, as shown in FIG. 11A and FIG. 11B, that corresponds to a leftward motion and a rightward motion, respectively, can be displayed on the display unit 70. Note that although such direction indicators are not essential to the processing of the camera device 100, it provides an useful indication to recognize whether the input operation has been accepted by the camera device 100.

Figure 12:
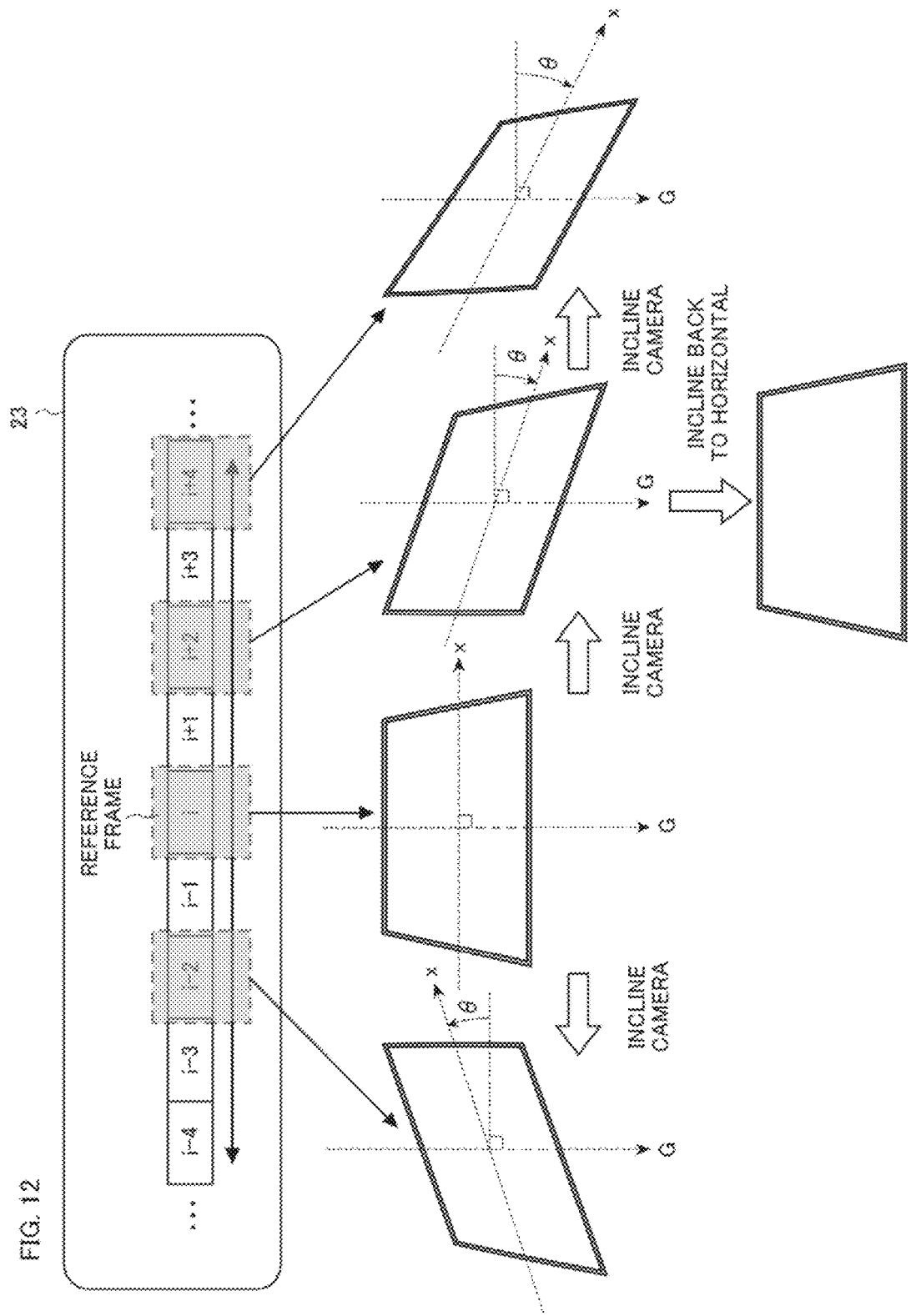
FIG. 12 shows another input operation to select a desired image according to another embodiment of the present disclosure.

FIG. 12 depicts, according to another embodiment of the present disclosure, another non-limiting example illustrating how a tilting angle (angle of inclination ($\theta$)) may be used to select a particular image from the series of images stored in memory.

The images are stored in the ring buffer memory 23 in a similar manner as that depicted in FIG. 6. Note that in FIG. 6 a displacement angle $\theta$ had a one-to-one relationship between the images which are stored in the memory. Specifically, each position of the device corresponded to an image in the ring buffer memory 23. Contrary to the example of FIG. 6, in the current example a magnitude of tilting the camera device 100 corresponds to a rate of switching of the images in the memory. Specifically, as shown in FIG. 12, reference frame 'i' corresponds to the initial position of the camera device 100 (exactly horizontal). In the present example the camera is tilted at a greater angle (higher value of $\theta$) to switch rapidly between the currently displayed frame and the desired frame that is to be displayed on the display panel. Correspondingly, a smaller displacement of the camera device 100 would indicate a slow switching between the image frames. In other words, to switch from the reference frame to a desired frame which lies close to the reference frame a small displacement of the camera device is sufficient.

Upon the desired image being displayed in the tilted position on the camera device 100, the desired (target) image may be maintained on the display following the camera device 100 being returned to a substantially horizontal position. Further extensions to this example are possible such as "locking in" the target image in response to maintaining the camera device 100 at a desired angle $\theta$ (when it displays the target image) for a fixed amount of time, whereupon further displacement (e.g., tilting of the device 100) will not result in further switching of the displayed image.

Figure 13:
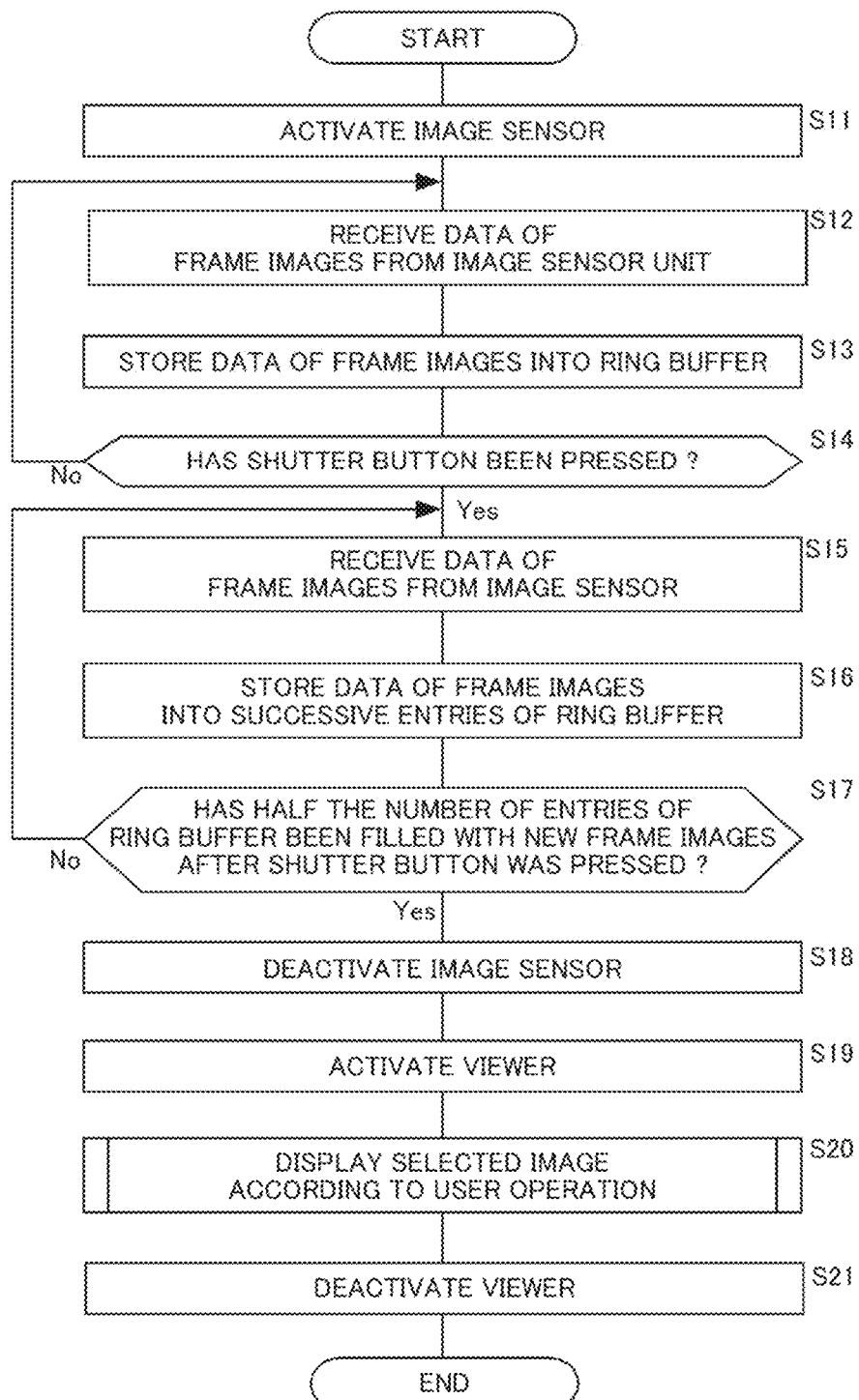
FIG. 13 is an exemplary flowchart illustrating the steps performed by the camera device according to an embodiment of the disclosure.

FIG. 13 is an exemplary flowchart illustrating the steps performed by the camera device 100 according to an embodiment of the present disclosure.

The process starts at step S11, wherein the image sensor 10 is activated to capture images of an object. In steps S12 and S13 the information pertaining to the images of the photographed object are received by the image sensor 10, and the images are consecutively stored as frames into memory slots of the ring buffer memory 23.

In step S14 a query is made to check if a shutter button has been pressed (i.e., if a shutter operation has been triggered). If the response to the query is negative, the process simply loops back to step S12 wherein the camera device continues to capture image frames of the photographed object. Note that steps S12 and S13 indicate a capture mode operation of the camera device 100. If the response to the query in step S14 is affirmative, the process proceeds to step S15 wherein the camera device 100 continues to receive image frames from the image sensor 10. Herein the camera device 100 may also be configured to tag the first image frame captured after the shutter operation has been activated as a reference frame. The image frames consecutively captured are stored into successive entries of a ring buffer as shown in step S16. A skilled artisan will also appreciate that another input operation (i.e., other than shutter operation) may be used as a trigger event at step S14.

In step S17, a query is made to check if the number of new frame images (captured after the trigger operation has been initiated) is equal to half the number of memory slots of the ring buffer memory 23.

If the response to the query in step S17 is negative, the process simply loops back to S15, wherein the camera device 100 continues to capture newer image frames of the photographed object. If the response to the query is affirmative, the process moves to step S18 wherein the image sensor 10 is deactivated. At this step, the image capturing mode of the camera is completed. Further, the camera device 100 may be configured to automatically activate the viewing mode as depicted in step S19.

In step S20, a desired image from the series of images captured by the camera device 100 is displayed on the display unit 70 based on a user operation (to be discussed with reference to FIG. 14). In step S21, the viewing mode of the camera device 100 is completed and the process thereby ends.

Figure 14:
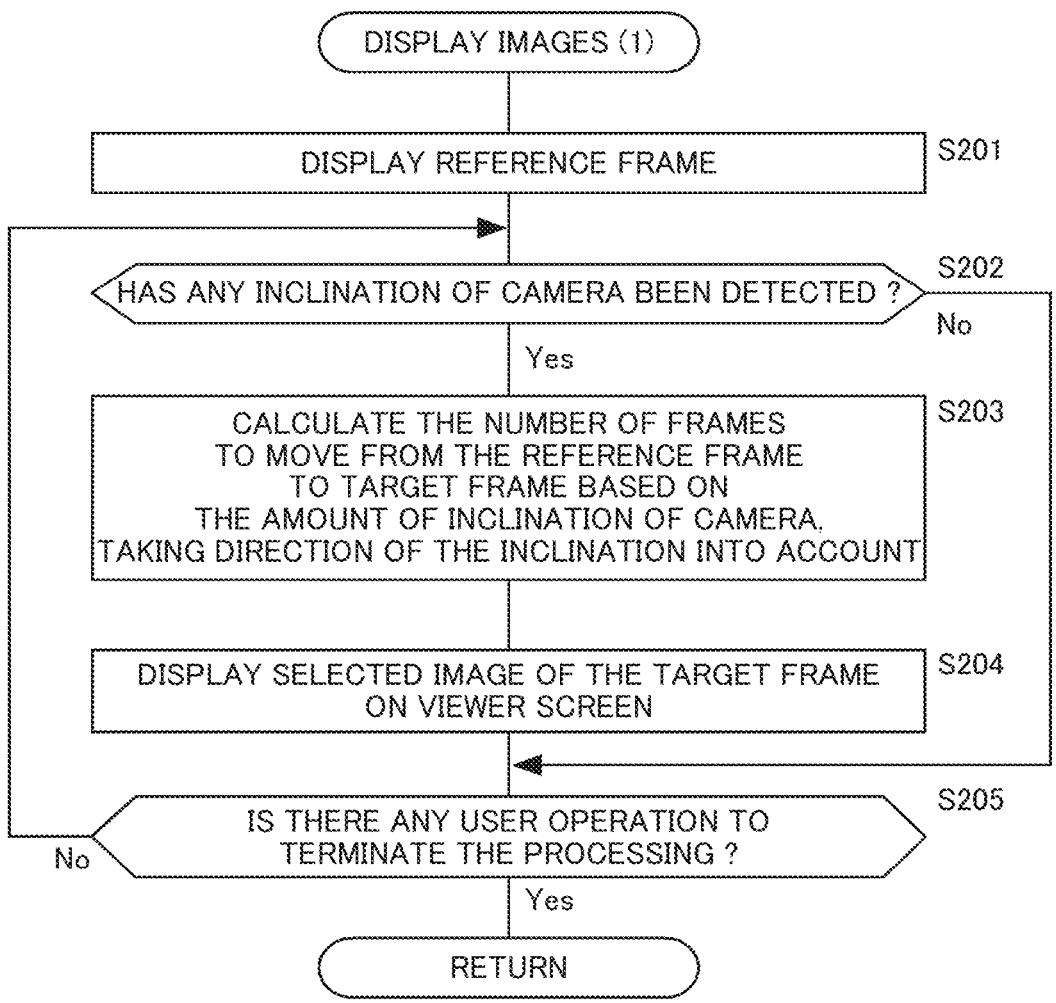
FIG. 14 is an exemplary flowchart illustrating the steps of displaying an image on the display panel according to an embodiment of the present disclosure.

FIG. 14 is a flowchart depicting an exemplary procedure of displaying an image according to an inclining operation of the camera device 100 (using the inclination sensor 50 to detect the angle of inclination). Specifically, the flowchart of FIG. 14 corresponds to the example illustrated in FIG. 6. The process starts in step S201 wherein the reference frame is displayed on the display unit 70. The process then proceeds to step S202 wherein a query is made to check if an inclination of the camera has been detected by the inclination sensor 50. If the response to the query is negative, the process proceeds to step S205. If the response to the query in step S202 is affirmative, the process proceeds to step S203 wherein, based on the inclination (and taking the direction of inclination into account), the control unit 40 computes the number of frames to move from the reference frame in order to display a desired (target frame) on the display unit 70. Note that in this process there is a one-to-one relationship between the magnitude of the angle of inclination and an image frame that is stored in the ring buffer memory.

Upon locating the desired image of the target frame, it is displayed on the display unit 70 in step S204. In step S205, a query is made to check if any user operation has been initiated to terminate the processing (switching of image frames). If the response to the query is negative, the process loops back to step S202 wherein the inclination sensor 50 continuously monitors to check if an inclination of the camera is detected. If the response to the query in step S205 is affirmative, the process merely ends.

Figure 15:
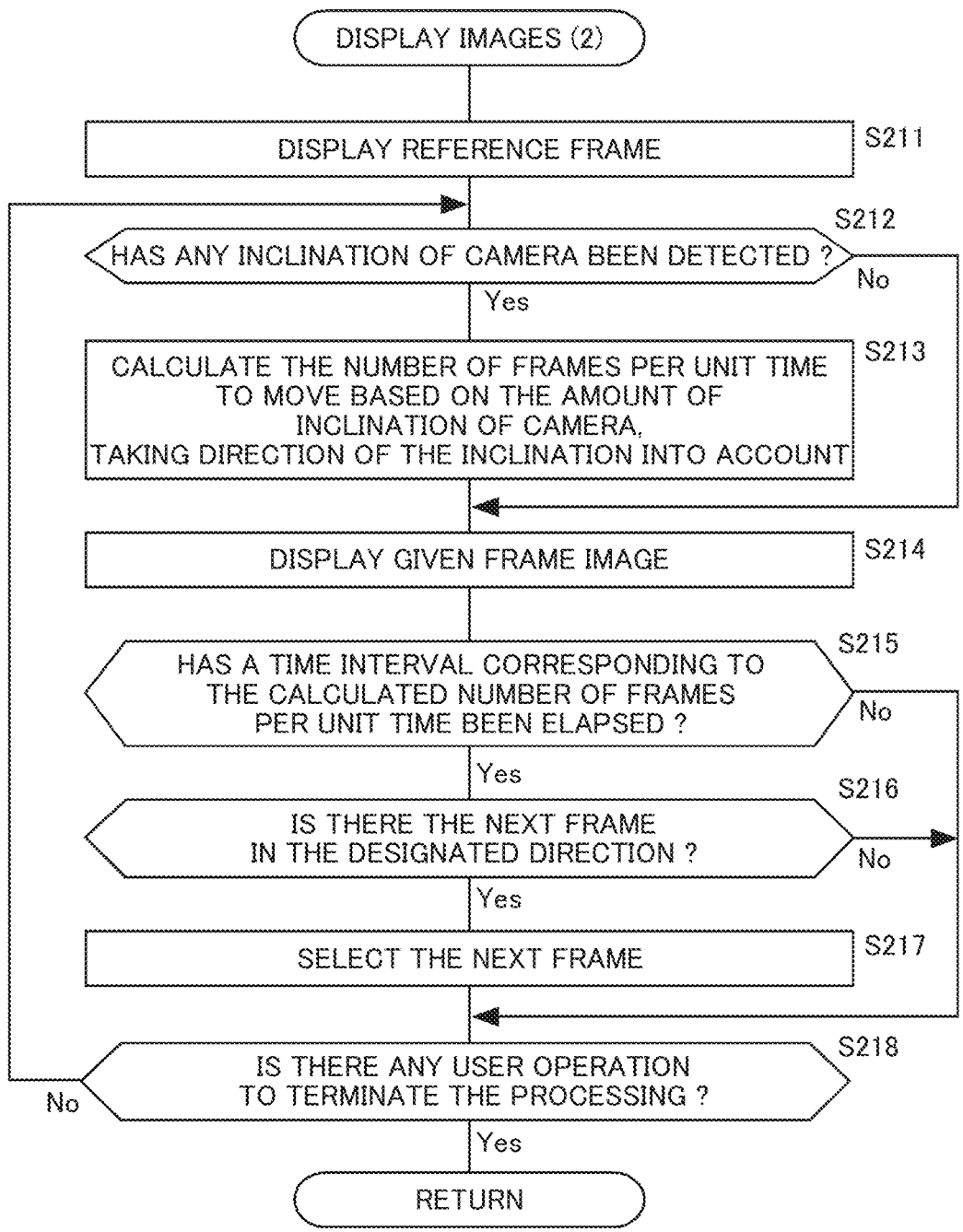
FIG. 15 is an exemplary flowchart illustrating the steps of displaying an image on the display panel according to another embodiment of the present disclosure.

FIG. 15 is an exemplary flowchart illustrating the steps of displaying an image on the display unit 70 of the camera device 100 based on an operation initiated by a user according to another embodiment of the present disclosure. Specifically, the flowchart depicted in FIG. 15 corresponds to the example illustrated in FIG. 12.

In step S211, the reference frame is displayed on the display unit 70 of the camera device 100. In step S212 a query is made to check if any inclination of the camera has been detected by the inclination sensor 50. If the response to the query is affirmative, the process proceeds to step S213, else if the response to the query is negative, the process proceeds to step S214.

In step S213, based on the amount of inclination of the camera (that is, the magnitude of θ) and accounting for the direction of inclination (rightward inclination or leftward inclination), the control unit 40 computes the number of frames per unit time that need to be switched in order to reach the desired image. In step S214 a given frame image is displayed on the display unit 70. Note that this frame image that is displayed may either be the reference frame of step S212 if no camera inclination is detected initially or may be the target frame based on the inclination of the camera.

In step S215, a query is made to check if a time interval corresponding to the computed number of frames per unit time (of step S213) has elapsed. If the response to the query is negative, the process moves to step S218, else the process proceeds to step S216. In step S216, another query is made to check if there is a next image frame (future frame) in the designated direction of inclination. If the response to this query of step S216 is affirmative, the next frame is selected (as shown in step S217), else if the response to the query (of step S216) is negative, the process proceeds to step S218 wherein a final query is made to check if there is a user operation initiated to terminate the processing of switching of image frames. If the response to the query of step S218 is negative, the process merely loops back to step S212 wherein the inclination sensor 50 continuously monitors if an inclination of the camera device 100 is detected. However, if the response to the query in step S218 is affirmative, the process ends.

Furthermore, in the embodiments discussed so far, the direction of switching an image, a moving distance, an angle and direction of camera inclination can be displayed on the display unit 70 of the camera device 100. Thus, a desired image frame can be found in a rapid and easy manner.

FIG. 16 depicts an exemplary touch operation to select a desired image within a series of images captured by the camera device 100 according to another embodiment of the present disclosure.

Note that the top three blocks of FIG. 16 are similar to those as described in FIG. 8, and the blocks explain the activation of the image sensor 10 (specifically the capture mode and the activation of the viewing mode) that is automatically initiated upon completion of the capture mode.

In the viewing mode initially the reference frame is depicted on the display unit 70. In order to select a particular image a touch operation is used to selectively switch the images which are stored in the ring buffer memory 23. For example, one can initiate a downward touch operation to select an image which is located further in the ring buffer memory 23. Alternately, an upward touch operation can be used to select an image which is stored prior to the initiation of the trigger (activation of shutter). In what follows, various examples of implementing the touch operation are described in detail to select a desired image from the plurality of images captured by the camera device 100.

Figure 17A:
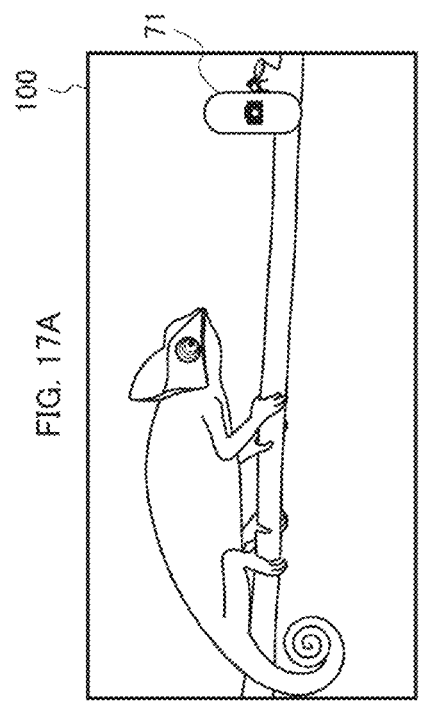
FIG. 17A-FIG. 17D depict an exemplary touch operation to select a desired image frame.
Figure 17B:
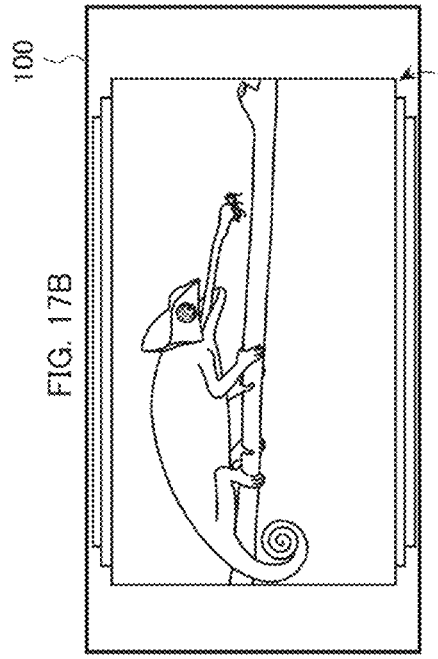

FIG. 17A shows an example of an image being displayed on the display unit 70 in the imaging process (capture mode of the camera device 100). Note that this is similar to the capture mode as depicted in FIG. 9A. Further note that the display unit 70 continues to sequentially display the image that is shot in a fixed time interval. A shutter button 71 is also displayed on the screen whereby a user can tap the button 71 to indicate a shutter trigger operation. Upon completion of the capture mode the reference image is automatically displayed on the display unit 70 as shown in FIG. 17B. Note that this is similar to the depiction as shown in FIG. 9B. A pile of images 73 that are captured in the capturing mode of the camera device 100 is also displayed as shown in FIG. 17B.

Figure 17C:
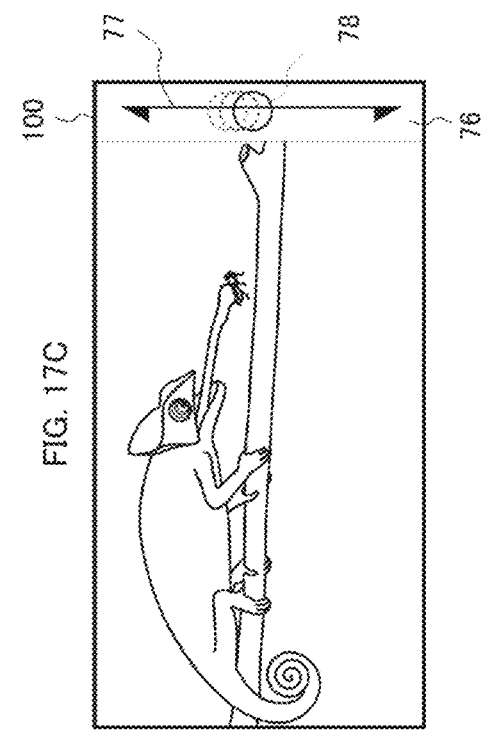
Figure 17D:
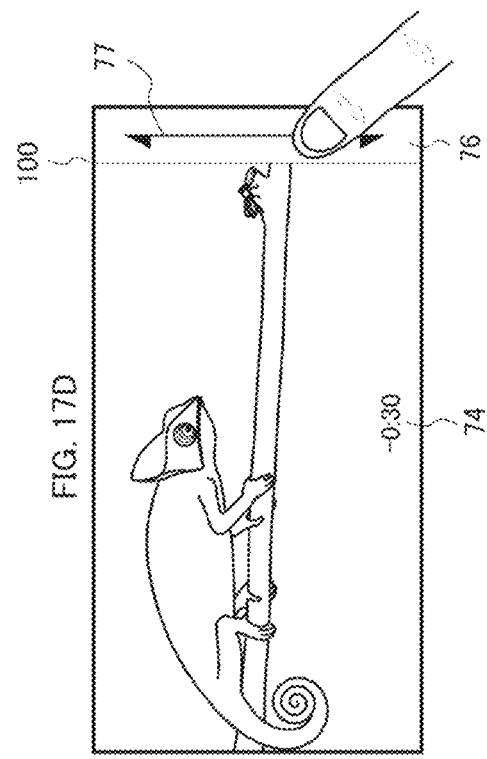

FIGS. 17C and 17D illustrate an example of using the touch operation for switching between the images in order to display a desired image from the series of images captured by the camera device 100.

In FIG. 17C a belt-shaped area 76, is displayed on the right-hand side of the display screen to provision for the selectively between the captured frames. Note that the belt area as depicted in FIG. 17C is merely for explanatory purposes. It is in no way limiting the scope of the present disclosure. The belt-shaped area 76 alternately could be placed at any desired position on the display unit 70. The display arrow 77 indicates the direction of switching between the image frames that are stored in the ring buffer memory 23 of the camera device 100. This may be accomplished by implementing a drag operation (performed by a finger, stylus or the like) along the belt-shaped area 76 in order to select a desired target frame. Further, a ring-shaped marker 78 may optionally be displayed on the belt-shaped area 76 to indicate the position of a the touch operation. Further, as shown in FIG. 17D the time stamp 74 for every image may also be displayed along with the image frame on the display unit 70. Note that the indication of the time stamp 74 is not necessary to the processing of the present disclosure. However, displaying the time stamp 74 provides an association between the different frames captured by the camera device 100.

FIGS. 18A and 18B show a modification of the example depicted in FIGS. 17C and 17D.

Note that in FIGS. 17C and 17D the displayed belt-shaped area 76 was located generally parallel to the right edge of the display unit 70. In FIG. 18A an operation area 76a wherein the touch operation is initiated is of an arc shape. Such an operational area as depicted by 18B is suitable for a user to rotationally move a finger along the circularly shaped arrow 77a to selectively switch a desired image frame. Further, similar to FIG. 17D, in FIG. 18B the time stamp 74 corresponding to an individual image frame is also displayed on the display unit 70.

FIGS. 19A to 19C show another example depicting the touch operation to select a desired image from a series of captured images. Specifically, in FIG. 19A the entire display unit 70 is assumed to be an operational touch area used by the user to selectively switch image frames.

As shown in FIG. 19A a user can initiate the capture mode of the camera device 100 by simply tapping a location on the display unit 70, as shown by marker 78.

Further, as shown in FIG. 19B, image switching can be accomplished by touching the finger in an arbitrary position of the display unit 70 shown by the ring-shaped marker 78. Specifically, the image frame switching is performed by implementing a drag operation (dragging of finger or stylus) along a side that is substantially parallel to the X-axis direction.

Further, note that although the present embodiment assumes that the drag operation is substantially linear a curved route may also be sufficient to implement this switching functionality of image frames. Alternately a moving distance of the finger's touch may also correspond to the number of frames (e.g., based on the present frame) to a target frame to be selectively switched in order to display the target frame on the display unit 70. Note that the direction in which the finger moves may either be a positive direction (direction of switching image frames that are captured latter to the initiation of the shutter trigger) or in a negative direction (that is, the direction of switching image frames that are captured prior to the initiation of the shutter trigger). Furthermore, note that the movement of the finger/stylus may also be performed along a Y-axis direction (that is, parallel to the short side of the display panel); or any other axis and/or area therebetween. Further, as shown in FIG. 19C the time stamp 74 may also be displayed on the display unit 70 that corresponds to a specific image within the series of images captured by the imaging device.

Alternatively, the touch panel of the camera device 100 may also be configured to detect an intensity or elapsed time interval of the touch operation to switch images captured by the device. Specifically, a prolonged touch may be one of a higher touch intensity and result in switching frames at a faster rate, whereas a touch operation that lasts for a short time duration may correspond to slow switching rate. It is to be noted that the method of implementing the touch operation is in no way limiting the scope of the present invention.

Figure 20:
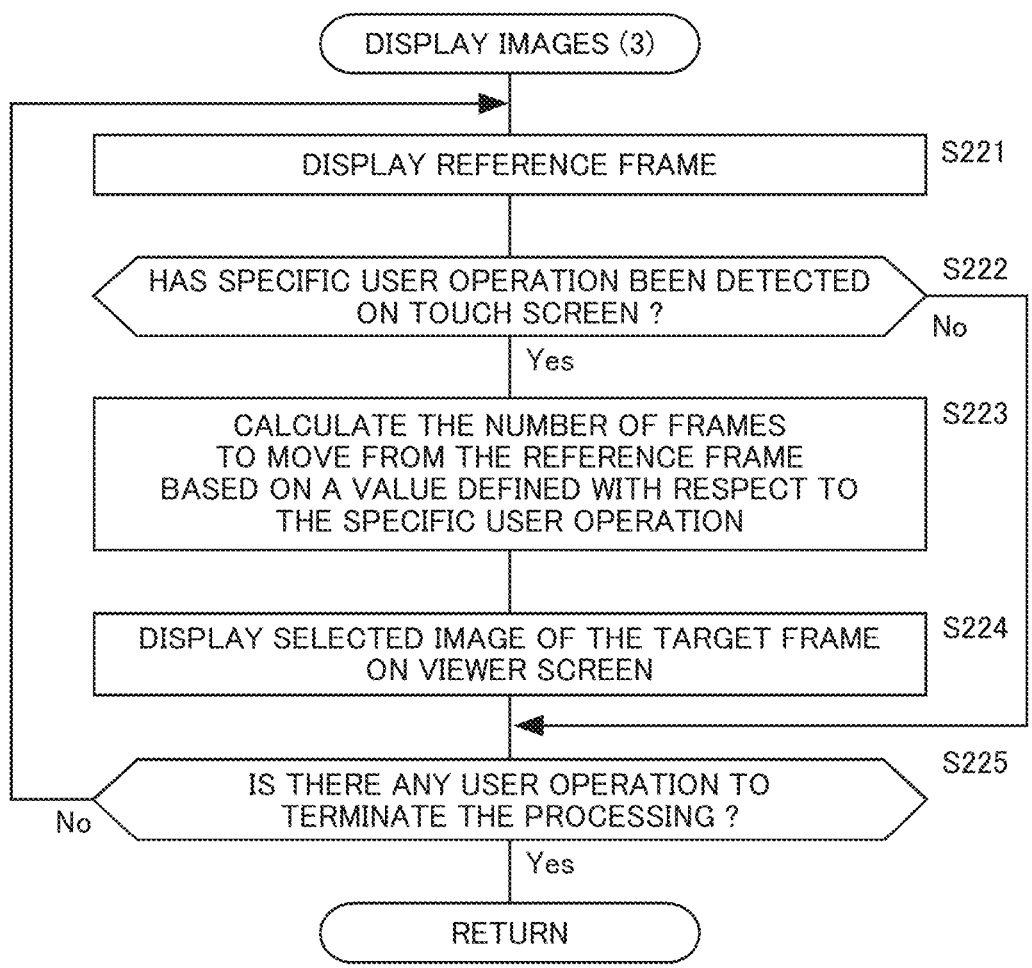
FIG. 20 is an exemplary flowchart illustrating the steps of displaying an image using the touch interface according to an embodiment of the present disclosure.

FIG. 20 is an exemplary flowchart illustrating the steps of displaying an image using the touch panel interface (touch operation) according to an embodiment of the present disclosure. The process starts in step S221 wherein a reference frame is displayed on the display unit 70. In step S222 a query is made to check if a touch has been detected on the touch panel. If the response to the query is affirmative, the process moves to step S223. If the response to the query is negative, the process proceeds to step S225.

In step S223, based on a value defined with respect to the touch operation, the number of frames that are to be switched from the reference frame are calculated by the control unit 40. Note that the value that corresponds to the number of frames to be switched may be computed based on the amount of the finger's drag on the display unit 70 of the camera device 100. Alternatively, the display belt wherein the touch operation is performed (sliding of finger or a stylus) to selectively switch between the frames may be calibrated in a manner such that a point on the display belt corresponds to a specific frame that is stored in the ring buffer memory 23.

In step S224 the target frame as selected by the user is displayed on the display unit 70. Further, in step S225 a query is made to check if there is a user initiated operation that indicates if the processing should be terminated. If the response to the query is negative, the process merely loops back to step S221 wherein the reference frame is displayed on the display panel. However, if the response to the query in step S225 is affirmative, the process merely ends.

Figure 21:
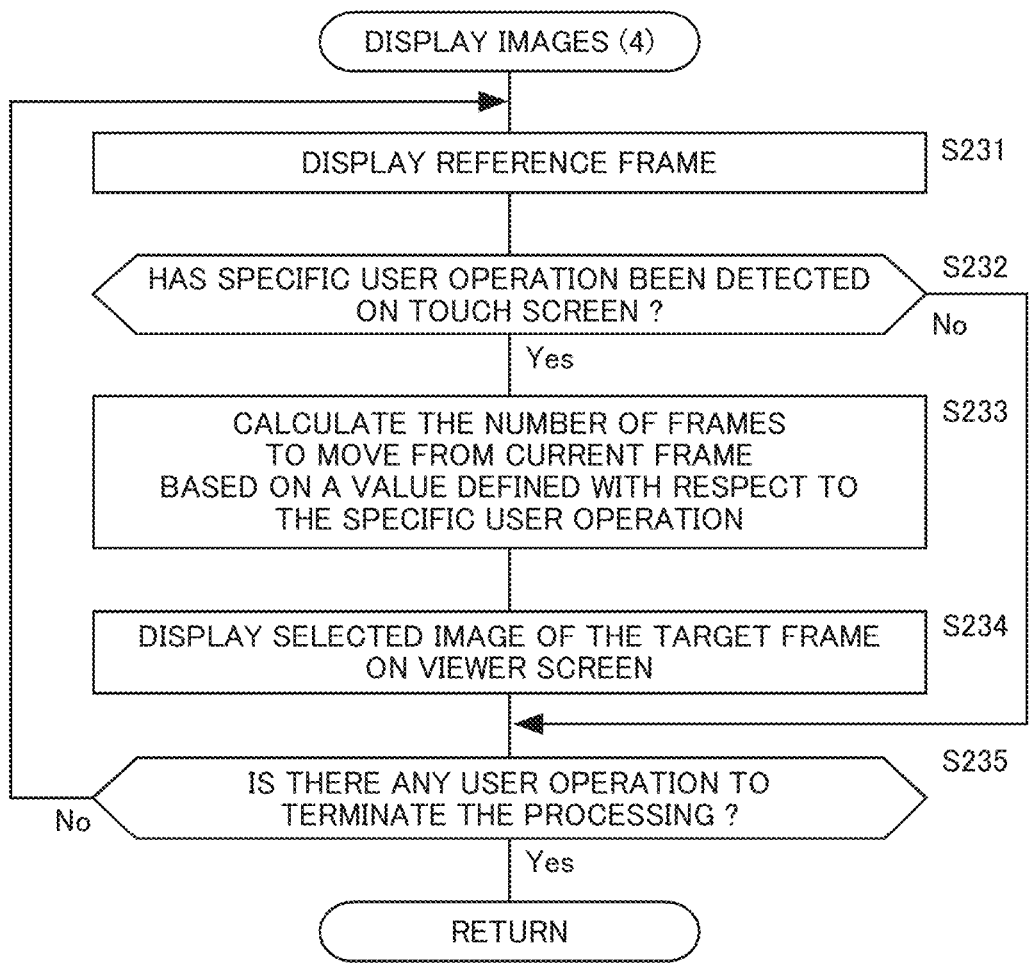
FIG. 21 is an exemplary flowchart illustrating the steps of displaying an image using the touch interface according to another embodiment of the present disclosure.

FIG. 21 is an exemplary flowchart that illustrates the steps of displaying a target image using the touch interface according to another embodiment of the present disclosure. Note that the steps as depicted in FIG. 21 (steps S231 to S235) are similar to the processing steps S221 to S225 as shown in FIG. 20. However, in this embodiment using the touch operation a user can switch from a current frame that is displayed on the display panel to a target frame from the series of image frames captured by the imaging device. Note that the currently displayed frame on the display frame may potentially be any one of the image frames that is stored in the ring buffer memory 23.

Obviously, numerous modifications and variations of the present invention are possible in light of the above teachings. It is therefore to be understood that within the scope of the appended claims, the invention may be practiced otherwise than as specifically described herein. For example, aspects of the present disclosure may be executed on a smart phone, a tablet, a general purpose computer, a laptop, an electronic reading device, or other such image capturing and displaying devices.

The above disclosure also encompasses the embodiments noted below.

(1) An image capturing apparatus comprising: one or more image sensors configured to capture a plurality of images at a capture rate; a memory configured to store the plurality of captured images; and circuitry configured to: detect an input trigger, capture a number of new images in response to detecting the input trigger, the number of new images being equal to a predetermined value, tag a first image, of the number of new images captured after detecting the input trigger, as a reference image, deactivate the sensor in response to capturing the number of new images, and control a display panel to display the reference image in response to deactivating the sensor.

(2) The image capturing apparatus of (1), wherein the circuitry is further configured to display, on the display panel based on a detection of a predetermined input operation, a target image of the plurality of captured images.

(3) The image capturing apparatus of (2), wherein: the circuitry is configured to calculate an inclination of the image capturing apparatus based on an input from one or more inclination sensors, and the input operation is an inclining operation, the inclining operation being performed on the image capturing apparatus with respect to a pair of reference axes.

(4) The image capturing apparatus of (3), wherein the pair of reference axes include a first axis that is substantially parallel to a first edge of the image capturing apparatus, and a gravity axis that is orthogonal to the first axis.

(5) The image capturing apparatus of (3), wherein in response to detecting the inclining operation, the circuitry calculates a magnitude of the inclination and a direction of the inclination of the image capturing apparatus.

(6) The image capturing apparatus of (5), wherein the direction of the inclination is based on a reference position of the image capturing apparatus, and is one of a first direction and a second direction, the first direction and the second direction being directed in a direction that is substantially opposite from one another.

(7) The image capturing apparatus of (5), wherein the circuitry associates a particular image of the plurality of captured images with the magnitude of inclination.

(8) The image capturing apparatus of (1), wherein: the predetermined value of the number of new captured images is equal in magnitude to half of a magnitude of a capacity of the memory, and the magnitude of the capacity of memory is at least twice a magnitude of the image capture rate.

(9) The image capturing apparatus of (1), wherein the circuitry is further configured to assign a time stamp to one or more of the plurality of captured images, the time stamp corresponding to a time the image was captured by the image capturing apparatus.

(10) The image capturing apparatus of (9), wherein the time stamp assigned to the one or more of the plurality of captured images is based on a predetermined time stamp assigned to the reference image.

(11) The image capturing apparatus of (1), wherein: the display panel is a touch panel including one or more touch sensors configured to detect a touch operation performed with an instruction object on a surface of the display panel, the input trigger corresponds to a touch operation performed at a corresponding position to a displayed position of a shutter button that is displayed on the display panel, and an instant of time when the shutter button is pressed corresponds to an instant of time of capturing a desired image, of the plurality of captured images.

(12) The image capturing apparatus of (1), wherein the memory is a ring buffer that is configured to store the plurality of captured images at sequential memory locations.

(13) The image capturing apparatus of (1), wherein the circuitry is further configured to: calculate, based on an input from one or more inclination sensors, a magnitude of inclination and a direction of inclination of the image capturing apparatus compute a rate of switching images on the display panel based on the magnitude of inclination of the apparatus, sequentially switch images based on the computed switching rate in a direction that corresponds to the direction of inclination of the apparatus, and control the display panel to display a target image when the inclination of the apparatus returns to a reference value of inclination.

(14) The image capturing apparatus of (13), wherein when the magnitude of inclination is less than a predetermined threshold, the circuitry controls the display panel to switch the images at a first switching rate, and when the magnitude of inclination is greater than the predetermined threshold, the circuitry controls the display panel to switch the images at a second switching rate that is faster than the first switching rate.

(15) The image capturing apparatus of (1), wherein: the display panel is a touch panel including one or more touch sensors configured to detect a touch operation performed with an instruction object on a surface of the display panel, the input operation is a touch operation detected by the circuitry on a surface of the display panel based on an output from the one or more touch sensors.

(16) The image capturing apparatus of (15), wherein the circuitry is further configured to: compute a value based on the touch operation, calculate a number of images to switch from a reference image displayed on the display panel based on the computed value, and control the display panel to display a particular image of the plurality of captured images, the particular image corresponding to the computed value of the touch operation.

(17) The image capturing apparatus of (16), wherein a touch region is displayed at a predetermined location on the display panel, the touch region including a marker that indicates a direction of movement of the touch operation.

(18) An image capturing method performed by an image capturing apparatus, the method comprising: capturing, by one or more image sensors, a plurality of images at a capture rate; detecting, by circuitry, an input trigger and continuing to capture a number of new images following the input trigger detection, the number of new images being equal to a predetermined value; tagging, by the circuitry, a first image, of the number of new images captured after the detecting, as a reference image; deactivating, by the circuitry, the one or more image sensors in response to capturing the number of new images; and controlling a display panel, by the circuitry in response to deactivating the one or more sensors, to display the reference image thereon.

(19) The method of (18), further comprising computing, by the circuitry, a target image to be displayed on the display panel based on an input operation.

(20) A non-transitory computer readable medium having stored thereon instructions that when executed by one or more processors causes the one or more processors to execute a method comprising: capturing, by one or more image sensors, a plurality of images at a capture rate; detecting, by circuitry, an input trigger and continuing to capture a number of new images following the input trigger detection, the number of new images being equal to a predetermined value; tagging, by the circuitry, a first image, of the number of new images captured after the detecting, as a reference image; deactivating, by the circuitry, the one or more image sensors in response to capturing the number of new images; and controlling a display panel, by the circuitry in response to deactivating the one or more sensors, to display the reference image thereon.

The invention claimed is:

1. An electronic device comprising:
a display;
an image sensor configured to capture shooting data, the shooting data comprising a plurality of consecutive frames of image data;
a memory configured to store the shooting data; and
circuitry configured to
control the display to display at least a first frame of the plurality of consecutive frames of image data, and a graphic indication that at least another frame of the plurality of consecutive frames of image data precede or follow the first frame of the plurality of consecutive frames of image data;
detect an input operation performed by a user, the input operation corresponding to a command to sequentially switch the shooting data displayed on the display between each of the plurality of consecutive frames of image data;
and
control the display to switch between each of the plurality of consecutive frames of image data based on the detected input operation.

2. The electronic device of claim 1, wherein
a magnitude of a capacity of the memory is at least a magnitude of a capture rate of the image sensor over two seconds.

3. The electronic device of claim 1, wherein
the circuitry is configured to assign a time stamp to one or more of the plurality of consecutive frames of image data, the time stamp corresponding to a time at which said one or more of the plurality of consecutive frames of image data were captured by the image capturing apparatus.

4. The electronic device of claim 1, wherein
the input operation performed by the user is a touch operation detected by the circuitry on a surface of the display.

5. The electronic device of claim 1, wherein
the memory is a ring buffer that is configured to store the plurality of consecutive frames of image data at sequential memory locations.

6. The electronic device of claim 1, wherein
the circuitry is configured to define an entirety of the display as an operational touch area configured to receive the input operation.

7. The electronic device of claim 1, wherein
the circuitry is configured to detect an input trigger.

8. The electronic device of claim 7, wherein
the circuitry is configured to control the image sensor to capture the shooting data, at least some of the plurality of images being captured before the input trigger.

9. The electronic device of claim 7, wherein
the circuitry is configured to control the display to display an image corresponding to a shutter button on the display, and
the input trigger is a touch input received at a position corresponding to the shutter button.

10. The electronic device of claim 1, wherein
the circuitry is configured to detect a continuous drag operation received at an operational touch area that corresponds to a position on the display at which the first frame is displayed.

11. The electronic device of claim 10, wherein
the circuitry is configured to control, responsive to the continuous drag operation, the display to switch from displaying the first frame to a second frame among the plurality consecutive frames of image data without displaying less than an entirety of the first frame by displaying at least one intermediate frame among the plurality of consecutive frames of image data before display of the second frame.

12. The electronic device of claim 11, wherein
the circuitry is configured to control the display, responsive to the continuous drag operation, to switch between the plurality of consecutive frames of image data successively in time order based on when they were captured by the image sensor.

13. The electronic device of claim 12, wherein
the circuitry is configured to identify the at least one intermediate frame to be displayed while controlling the display to switch from displaying the first frame to displaying the second frame based on a direction of displacement of an instruction object received at the operational touch area during the continuous drag operation.

14. The electronic device of claim 13, wherein
the circuitry is configured to control the display to display a marker indicating a direction of movement of the displacement.

15. The electronic device of claim 10, wherein
the operational touch area corresponds to an entirety of the display.

16. A method performed by an electronic device that includes a display, circuitry, an image sensor configured to capture shooting data, the shooting data comprising a plurality of consecutive frames of image data, and a memory configured to store the shooting data, the method comprising:
control the display to display at least a first frame of the plurality of consecutive frames of image data, and a graphic indication that at least another frame of the plurality of consecutive frames of image data precede or follow the first frame of the plurality of consecutive frames of image data;
detect an input operation performed by a user, the input operation corresponding to a command to sequentially switch the shooting data displayed on the display between each of the plurality of consecutive frames of image data; and
control the display to switch between each of the plurality of consecutive frames of image data based on the detected input operation.

17. A non-transitory computer readable medium having stored thereon instructions that when executed by one or more processors causes the one or more processors to execute a method comprising:
controlling a display to display at least a first frame of a plurality of consecutive frames of image data, and a graphic indication that at least another frame of the plurality of consecutive frames of image data precede or follow the first frame of the plurality of consecutive frames of image data;
detect an input operation performed by a user, the input operation corresponding to a command to sequentially switch the shooting data displayed on the display between each of the plurality of consecutive frames of image data; and
control the display to switch between each of the plurality of consecutive frames of image data based on the detected input operation.

\* \* \* \* \*